US008465658B2

(12) United States Patent
Araki et al.

(10) Patent No.: US 8,465,658 B2
(45) Date of Patent: Jun. 18, 2013

(54) METHOD OF FORMING MAIN POLE OF THERMALLY-ASSISTED MAGNETIC RECORDING HEAD

(75) Inventors: Hironori Araki, Milpitas, CA (US); Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 140 days.

(21) Appl. No.: 13/110,442

(22) Filed: May 18, 2011

(65) Prior Publication Data
US 2012/0292287 A1   Nov. 22, 2012

(51) Int. Cl.
*B44C 1/22* (2006.01)
*G11B 5/127* (2006.01)
*G11B 11/00* (2006.01)

(52) U.S. Cl.
USPC ........ 216/22; 216/2; 216/24; 216/41; 216/56; 216/58; 216/67; 216/69; 216/70; 216/71; 360/125.01; 360/125.02; 360/125.03; 360/125.04; 360/125.05; 360/125.06; 29/602.1; 29/603.01; 29/603.07; 29/603.13; 369/13.01; 369/13.02; 369/13.14; 369/13.17; 369/13.18; 369/13.22; 369/13.24; 369/13.32; 369/13.33

(58) Field of Classification Search
USPC .................. 216/2, 22, 24, 41, 56, 58, 67, 69, 216/70, 71; 360/125.01, 125.02, 125.03, 360/125.04, 125.05, 125.06; 29/602.1, 603.01, 29/603.07, 603.13; 369/13.01, 13.02, 13.14, 369/13.17, 13.18, 13.22, 13.24, 13.32, 13.33
See application file for complete search history.

(56) References Cited

U.S. PATENT DOCUMENTS

| 7,911,883 | B2 * | 3/2011 | Sasaki et al. ............... 369/13.33 |
|---|---|---|---|
| 8,040,761 | B2 * | 10/2011 | Kawamori et al. ......... 369/13.33 |
| 8,089,830 | B2 * | 1/2012 | Isogai et al. ............... 369/13.33 |
| 8,164,986 | B2 * | 4/2012 | Aoki et al. ................. 369/13.01 |
| 8,233,358 | B2 * | 7/2012 | Zhou et al. ................. 369/13.33 |
| 8,343,364 | B1 * | 1/2013 | Gao et al. ........................ 216/22 |
| 2008/0239541 | A1 * | 10/2008 | Shimazawa et al. ............ 360/59 |
| 2009/0168220 | A1 * | 7/2009 | Komura et al. .................. 360/59 |
| 2009/0277870 | A1 * | 11/2009 | Sasaki et al. .................... 216/22 |
| 2010/0172220 | A1 | 7/2010 | Komura et al. |
| 2010/0260015 | A1 * | 10/2010 | Sasaki et al. ............... 369/13.02 |
| 2011/0096435 | A1 * | 4/2011 | Sasaki et al. ............. 360/114.01 |
| 2011/0149426 | A1 * | 6/2011 | Araki et al. ...................... 360/59 |
| 2012/0315716 | A1 * | 12/2012 | Araki et al. ...................... 438/31 |

* cited by examiner

*Primary Examiner* — Nadine G Norton
*Assistant Examiner* — Christopher Remavege
(74) *Attorney, Agent, or Firm* — Oliff & Berridge, PLC

(57) ABSTRACT

In a method of forming a main pole, an initial accommodation layer is etched by RIE using a first etching mask having a first opening, whereby a groove is formed in the initial accommodation layer. Next, a part of the initial accommodation layer including the groove is etched by RIE using a second etching mask having a second opening, so that the groove becomes an accommodation part. The main pole is then formed in the accommodation part. The first etching mask has first and second sidewalls that face the first opening and are opposed to each other at a first distance in a track width direction. The second etching mask has third and fourth sidewalls that face the second opening and are opposed to each other at a second distance greater than the first distance.

10 Claims, 15 Drawing Sheets ns of the main
METHOD OF FORMING MAIN POLE OF THERMALLY-ASSISTED MAGNETIC RECORDING HEAD

BACKGROUND OF THE INVENTION

1. Field of the Invention

The present invention relates to a method of forming a main pole of a thermally-assisted magnetic recording head which performs data writing by irradiating a recording medium with near-field light to lower the coercivity of the recording medium, and a method of manufacturing the thermally-assisted magnetic recording head.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

U.S. Patent Application Publication No. 2010/0172220 A1 discloses a technology for coupling the light that propagates through the waveguide with the plasmon generator in surface plasmon mode via a buffer part, thereby exciting surface plasmons on the plasmon generator.

For a thermally-assisted magnetic recording head having the aforementioned waveguide and plasmon generator and a main pole for producing a write magnetic field, it is required that the main pole, a part of the core of the waveguide, and the plasmon generator be disposed in a very small region in the vicinity of the medium facing surface.

To meet the aforementioned requirement, the thermally-assisted magnetic recording head may be configured such that the core is located farther from the top surface of the substrate than is the plasmon generator, the core has an end face that faces toward the medium facing surface and that is located away from the medium facing surface, and the main pole is interposed between the medium facing surface and the end face of the core.

In the aforementioned configuration, the main pole has a front end face, i.e., an end face located in the medium facing surface, and a rear end face or the other end face that is opposite to the front end face. To employ the aforementioned configuration, it is required that a large write magnetic field be locally generated from a part of the front end face of the main pole located close to the plasmon generator. For that purpose, the front end face of the main pole preferably has such a shape that a first end closer to the top surface of the substrate is smaller in width in the track width direction than a second end farther from the top surface of the substrate.

To employ the aforementioned configuration, it is further required that the light propagating through the core be efficiently transformed into near-field light. To this end, it is preferred that the end face of the core facing toward the medium facing surface be as close to the medium facing surface as possible in order to allow the plasmon generator to excite surface plasmons at the nearest possible point to the medium facing surface. Furthermore, a larger contact area between the end face of the core and the rear end face of the main pole leads to a greater ratio of the amount of light absorbed by the main pole to the amount of light propagating through the core. It is therefore preferable to reduce the contact area between the end face of the core and the rear end face of the main pole as much as possible. Taking these into account, it is preferred that the rear end face of the main pole be perpendicular or almost perpendicular to the top surface of the substrate.

As can be seen from the discussions above, to employ the aforementioned configuration, the main pole preferably has such a shape that the rear end face is perpendicular or almost perpendicular to the top surface of the substrate, and the first end of the front end face is smaller in width in the track width direction than the second end of the front end face. However, it is not easy to form a main pole of such a shape.

OBJECTS AND SUMMARY OF THE INVENTION

It is a first object of the present invention to provide a method of forming a main pole of a thermally-assisted magnetic recording head having such a configuration that the core of a waveguide is located farther from the top surface of a substrate than is a plasmon generator, the core has an end face that faces toward a medium facing surface and is located away from the medium facing surface, and the main pole is interposed between the end face of the core and the medium facing surface. The main pole has a rear end face that is perpendicular or almost perpendicular to the top surface of the substrate, and a front end face having a first end closer to the top surface of the substrate and a second end farther from the top surface of the substrate, the first end being smaller than the second end in width in the track width direction. The method allows for easily forming such a main pole.

It is a second object of the present invention to provide a method of manufacturing a thermally-assisted magnetic recording head having such a configuration that the core of a waveguide is located farther from the top surface of a substrate than is a plasmon generator, the core has an end face that faces toward a medium facing surface and is located away from the medium facing surface, and the main pole is interposed between the end face of the core and the medium facing surface. The main pole has a rear end face that is perpendicular or almost perpendicular to the top surface of the substrate, and a front end face having a first end closer to the top surface of the substrate and a second end farther from the top surface of the substrate, the first end being smaller than the second end in width in the track width direction. The method allows for easily forming such a main pole.

A thermally-assisted magnetic recording head to which the method of forming a main pole and the method of manufacturing a thermally-assisted magnetic recording head of the present invention are applicable includes: a medium facing surface that faces a recording medium; a main pole that produces a write magnetic field for writing data on the recording medium; an accommodation layer including an accommodation part that accommodates the main pole; a waveguide having a core and a clad, the core allowing light to propagate therethrough; a plasmon generator; and a substrate having a top surface. The main pole, the accommodation layer, the waveguide, and the plasmon generator are disposed above the top surface of the substrate. The plasmon generator has a near-field light generating part located in the medium facing surface, and is configured so that a plasmon is excited based on the light propagating through the core, and the near-field light generating part generates near-field light based on the plasmon.

The core has an end face that faces toward the medium facing surface and that is located away from the medium facing surface. The core is located farther from the top surface of the substrate than is the plasmon generator. The main pole has a front end face located in the medium facing surface and a rear end face opposite to the front end face. The main pole is interposed between the end face of the core and the medium facing surface. The accommodation layer has a wall face that faces the accommodation part and that defines the shape of the rear end face of the main pole. The front end face of the main pole has a first end closer to the top surface of the substrate and a second end farther from the top surface of the substrate. The first end is smaller than the second end in width in the track width direction.

The method of manufacturing the thermally-assisted magnetic recording head of the present invention includes the steps of forming the plasmon generator; forming the waveguide after the plasmon generator is formed; and forming the accommodation layer and the main pole after the plasmon generator is formed.

The step of forming the accommodation layer and the main pole in the method of manufacturing the thermally-assisted magnetic recording head of the present invention or the method of forming the main pole of the present invention includes: a step of forming an initial accommodation layer having a top surface; a step of forming a first etching mask on the top surface of the initial accommodation layer, the first etching mask having a first opening; a first etching step of etching the initial accommodation layer by reactive ion etching using the first etching mask to thereby form a groove in the initial accommodation layer; a step of forming a second etching mask on the top surface of the initial accommodating layer after the first etching step, the second etching mask having a second opening; a second etching step of etching a part of the initial accommodation layer including the groove by reactive ion etching using the second etching mask so that the initial accommodation layer becomes the accommodation layer and the groove becomes the accommodation part; and a step of forming the main pole in the accommodation part.

The first etching mask has first and second sidewalls that face the first opening. The first and second sidewalls are opposed to each other and are at a first distance from each other in the track width direction. The second etching mask has third and fourth sidewalls that face the second opening. The third and fourth sidewalls are opposed to each other and are at a second distance from each other in the track width direction, the second distance being greater than the first distance. In any cross section of the accommodation part parallel to the medium facing surface, an end closest to the top surface of the substrate is smaller in width in the track width direction than an end farthest from the top surface of the substrate.

The step of forming the accommodation layer and the main pole in the method of manufacturing the thermally-assisted magnetic recording head of the present invention or the method of forming the main pole of the present invention may further include a step of forming a third etching mask on the top surface of the initial accommodation layer before the step of forming the first etching mask. The third etching mask is intended for defining the position of the wall face of the accommodation layer. In this case, the first etching step etches the initial accommodation layer using the first etching mask and the third etching mask. The second etching step etches the initial accommodation layer using the second etching mask and the third etching mask.

In the method of manufacturing the thermally-assisted magnetic recording head of the present invention or the method of forming the main pole of the present invention, the wall face of the accommodation layer may form an angle of 10° or less with respect to the direction perpendicular to the top surface of the substrate.

In the method of manufacturing the thermally-assisted magnetic recording head of the present invention or the method of forming the main pole of the present invention, the accommodation layer may also serve as the core or the clad.

The method of manufacturing the thermally-assisted magnetic recording head of the present invention or the method of forming the main pole of the present invention allows for easily forming a pole layer having such a shape that the rear end face is perpendicular or almost perpendicular to the top surface of the substrate and the first end of the front end face closer to the top surface of the substrate is smaller in width in the track width direction than the second end of the front end face farther from the top surface of the substrate.

Other and further objects, features and advantages of the present invention will appear more fully from the following description.

DETAILED DESCRIPTION OF THE PREFERRED EMBODIMENTS

First Embodiment

Figure 1:
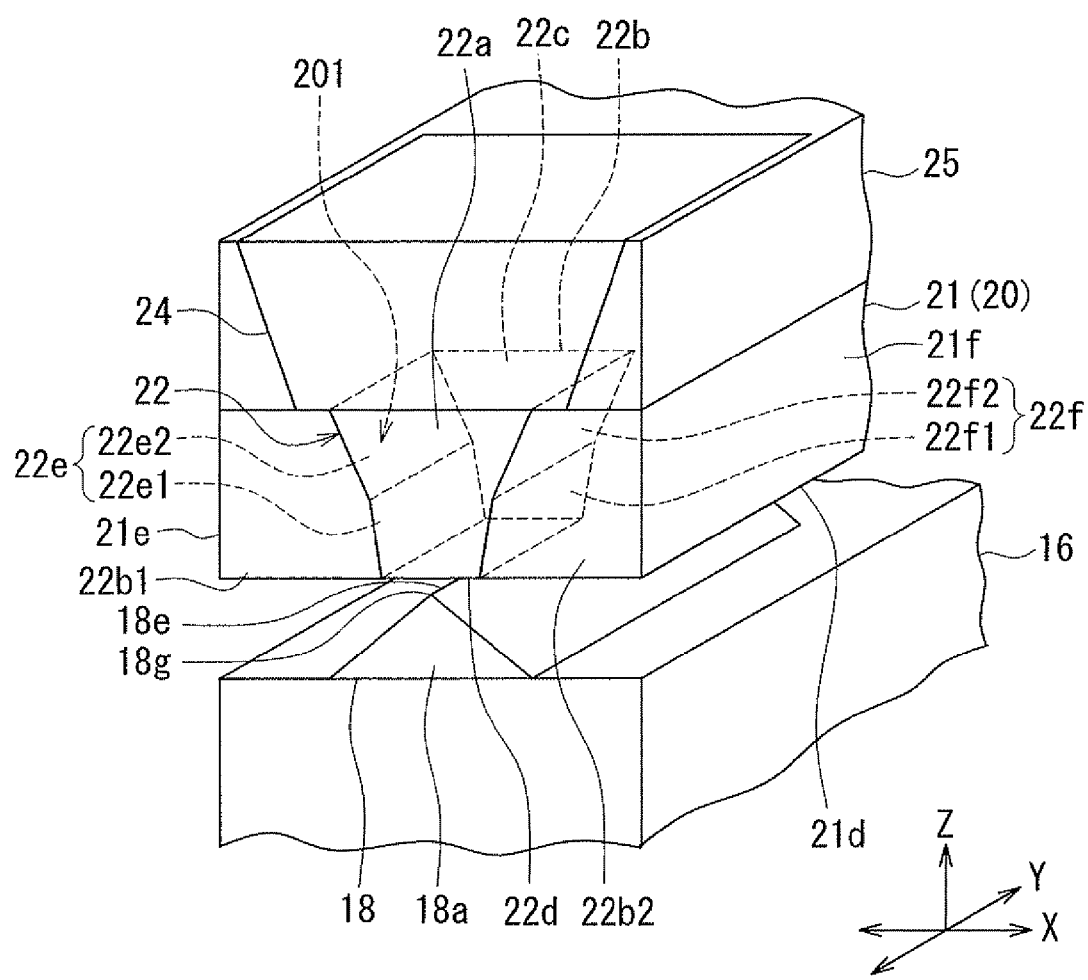
FIG. 1 is a perspective view showing the main part of a thermally-assisted magnetic recording head according to a first embodiment of the invention.
Figure 2:
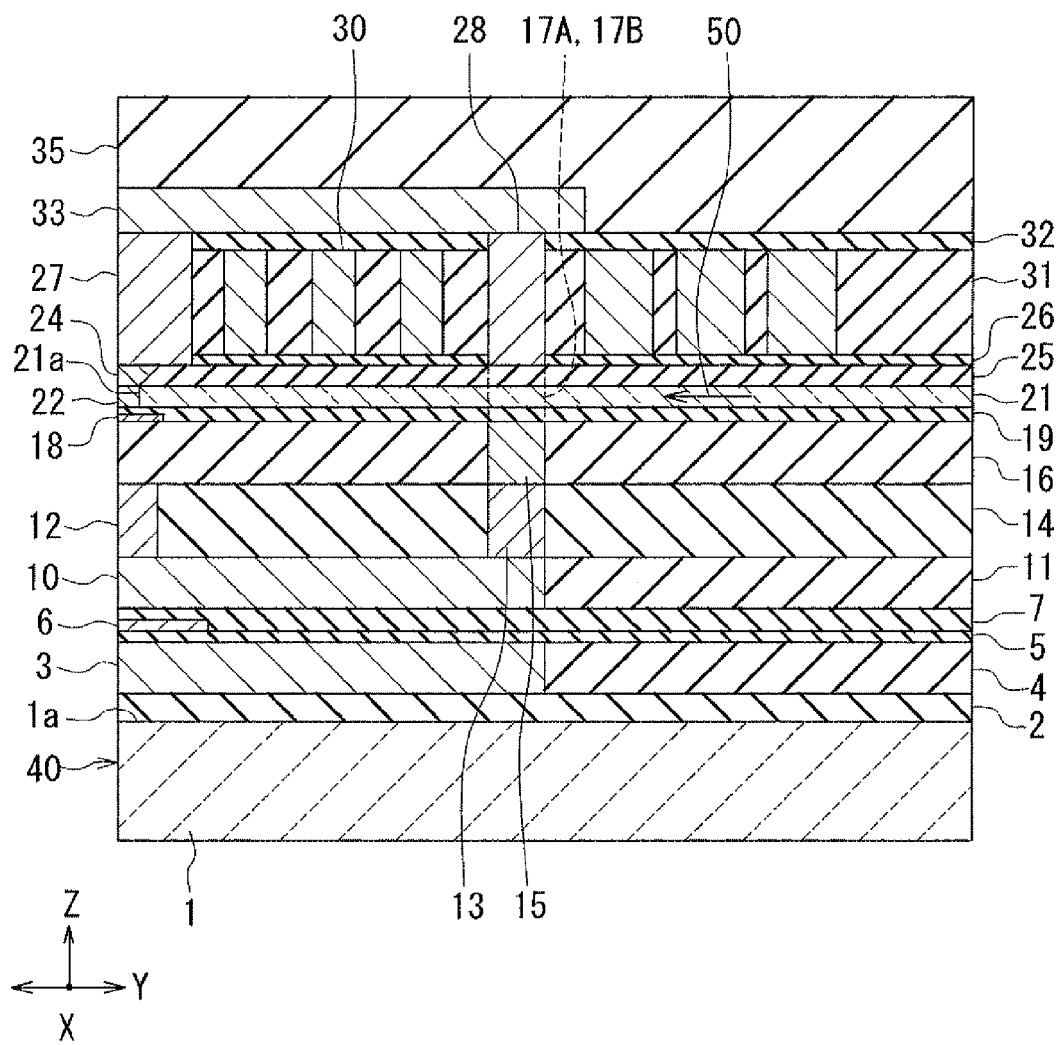
FIG. 2 is a cross-sectional view showing the configuration of the thermally-assisted magnetic recording head according to the first embodiment of the invention.
Figure 3:
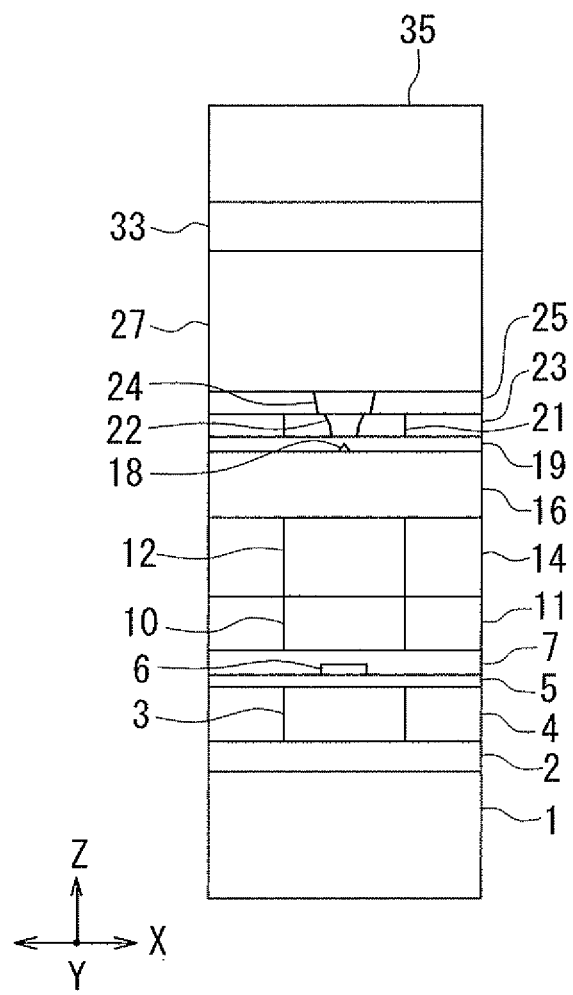
FIG. 3 is a front view showing the medium facing surface of the thermally-assisted magnetic recording head according to the first embodiment of the invention.

Preferred embodiments of the present invention will now be described in detail with reference to the drawings. First, reference is made to FIG. 1 to FIG. 3 to describe the configuration of a thermally-assisted magnetic recording head according to a first embodiment of the invention. FIG. 1 is a perspective view showing the main part of the thermally-assisted magnetic recording head. FIG. 2 is a cross-sectional view showing the configuration of the thermally-assisted magnetic recording head. FIG. 3 is a front view showing the medium facing surface of the thermally-assisted magnetic recording head.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium facing surface 40 that faces the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 2 and FIG. 3, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 4 disposed around the bottom shield layer 3 on the insulating layer 2. The insulating layers 2 and 4 are made of alumina ($Al_2O_3$), for example. The Z direction is also a direction perpendicular to the top surface 1a of the substrate 1.

The thermally-assisted magnetic recording head further includes: a bottom shield gap film 5 which is an insulating film disposed over the top surfaces of the bottom shield layer 3 and the insulating layer 4; a magnetoresistive (MR) element 6 serving as a read element disposed on the bottom shield gap film 5; two leads (not shown) connected to the MR element 6; and a top shield gap film 7 which is an insulating film disposed on the MR element 6.

An end of the MR element 6 is located in the medium facing surface 40 facing the recording medium. The MR element 6 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The thermally-assisted magnetic recording head further includes a return pole layer 10 made of a magnetic material and disposed on the top shield gap film 7, and an insulating layer 11 disposed around the return pole layer 10 on the top shield gap film 7. The insulating layer 11 is made of alumina, for example.

The thermally-assisted magnetic recording head further includes: a shield layer 12 made of a magnetic material and disposed on the return pole layer 10 in the vicinity of the medium facing surface 40; a coupling layer 13 made of a magnetic material and disposed on the return pole layer 10 at a position that is farther from the medium facing surface 40 than is the position of the shield layer 12; and an insulating layer 14 disposed over the return pole layer 10 and the insulating layer 11 and surrounding the shield layer 12 and the coupling layer 13. The shield layer 12 has an end face located in the medium facing surface 40. The insulating layer 14 is made of alumina, for example.

The thermally-assisted magnetic recording head further includes a coupling layer 15 made of a magnetic material and disposed on the coupling layer 13, and an insulating layer 16 disposed over the shield layer 12 and the insulating layer 14 and surrounding the coupling layer 15. The insulating layer 16 is made of alumina, for example. The top surfaces of the coupling layer 15 and the insulating layer 16 are even with each other.

The thermally-assisted magnetic recording head further includes a plasmon generator 18 disposed on the insulating layer 16 in the vicinity of the medium facing surface 40. The plasmon generator 18 is made of a metal. More specifically, the plasmon generator 18 is made of one of Au, Ag, Al, Cu, Pd, Pt, Rh and Ir, or of an alloy composed of two or more of these elements. A detailed description will be made later as to the shape of the plasmon generator 18.

The thermally-assisted magnetic recording head further includes a main pole 22 made of a magnetic material and disposed above the plasmon generator 18, and a coupling layer 24 made of a magnetic material and disposed on the main pole 22. Each of the main pole 22 and the coupling layer 24 has a front end face located in the medium facing surface 40 and a rear end face opposite to the front end face. As shown in FIG. 2, the rear end face of the coupling layer 24 is inclined with respect to the direction perpendicular to the top surface 1a of the substrate 1 (the Z direction). The distance from the medium facing surface 40 to any given point on the rear end face of the coupling layer 24 increases with increasing distance from the given point to the top surface 1a of the substrate 1. The main pole 22 will be described in detail later.

The thermally-assisted magnetic recording head further includes a waveguide having a core 21 and a clad. The core 21 is located farther from the top surface 1a of the substrate 1 than is the plasmon generator 18. The core 21 has an end face 21a that faces toward the medium facing surface 40 and that is located away from the medium facing surface 40. The main pole 22 is interposed between the end face 21a and the medium facing surface 40.

The clad includes clad layers 19, 23, and 25. The clad layer 19 lies over the coupling layer 15, the insulating layer 16, and the plasmon generator 18. The core 21 and the main pole 22 are disposed on the clad layer 19. The clad layer 19 is interposed between the plasmon generator 18 and each of the core 21 and the main pole 22. The clad layer 23 lies on the clad layer 19 and surrounds the core 21. The top surfaces of the core 21, the main pole 22 and the clad layer 23 are even with each other. The clad layer 25 lies over the core 21 and the clad layer 23 and surrounds the coupling layer 24.

The core 21 is made of a dielectric material that transmits laser light to be used for generating near-field light. The laser light emitted from a not-shown laser diode enters the core 21 and propagates through the core 21. The clad layers 19, 23, and 25 are each made of a dielectric material that has a refractive index lower than that of the core 21. For example, the core 21 can be made of tantalum oxide such as $Ta_2O_5$ or silicon oxynitride (SiON), and the clad layers 19, 23, and 25 can be made of silicon dioxide ($SiO_2$) or alumina. The core 21 will be described in more detail later.

The thermally-assisted magnetic recording head further includes two coupling portions 17A and 17B embedded in the clad layer 19, 23 and 25 at positions away from the medium facing surface 40. The coupling portions 17A and 17B are made of a magnetic material. The coupling portions 17A and 17B are located on opposite sides of the core 21 in the track width direction, each being spaced from the core 21. Although not shown, each of the coupling portions 17A and 17B includes a first layer lying on the coupling layer 15, and a second layer and a third layer stacked in this order on the first layer.

The thermally-assisted magnetic recording head further includes a coupling layer 27 made of a magnetic material and disposed on the coupling layer 24, and a coupling layer 28 made of a magnetic material and disposed on the coupling portions 17A and 17B.

The thermally-assisted magnetic recording head further includes an insulating layer 26 disposed on the clad layer 25, and a coil 30 disposed on the insulating layer 26. The coil 30 is planar spiral-shaped and wound around the coupling layer 28. The insulating layer 26 is made of alumina, for example. The coil 30 is made of a conductive material such as copper.

The thermally-assisted magnetic recording head further includes: an insulating layer 31 disposed around the coil 30 and the coupling layers 27 and 28 and in the space between every adjacent turns of the coil 30; and an insulating layer 32 disposed over the coil 30 and the insulating layer 31. The top surfaces of the coupling layers 27 and 28 and the insulating layer 32 are even with each other. The insulating layers 31 and 32 are made of alumina, for example.

The thermally-assisted magnetic recording head further includes: a yoke layer 33 made of a magnetic material and disposed over the coupling layers 27 and 28 and the insulating layer 32; and a protection layer 35 disposed to cover the yoke layer 33. The yoke layer 33 magnetically couples the coupling layer 27 and the coupling layer 28 to each other. The protection layer 35 is made of alumina, for example.

The parts from the bottom shield layer 3 to the return pole layer 10 constitute a read head. The parts from the return pole layer 10 to the yoke layer 33 constitute a write head. The coil 30 produces a magnetic field corresponding to data to be written on the recording medium. The shield layer 12, the return pole layer 10, the coupling layers 13 and 15, the coupling portions 17A and 17B, the coupling layer 28, the yoke layer 33, the coupling layers 27 and 24, and the main pole 22 form a magnetic path for passing a magnetic flux corresponding to the magnetic field produced by the coil 30. The main pole 22 allows the magnetic flux corresponding to the magnetic field produced by the coil 30 to pass, and produces a write magnetic field for writing data on the recording medium by means of a perpendicular magnetic recording system.

As has been described, the thermally-assisted magnetic recording head according to the present embodiment includes the medium facing surface 40, the read head, and the write head. The medium facing surface 40 faces the recording medium. The read head and the write head are stacked on the substrate 1. Relative to the read head, the write head is located forward along the direction of travel of the recording medium (the Z direction) (i.e., located on the trailing side).

The read head includes the MR element 6 serving as a read element, and the bottom shield layer 3 and a top shield layer for shielding the MR element 6. The bottom shield layer 3 and the top shield layer have their respective portions that are located near the medium facing surface 40 and that are opposed to each other with the MR element 6 therebetween. In the present embodiment, the return pole layer 10 of the write head also serves as the top shield layer of the read head. The read head further includes the bottom shield gap film 5 disposed between the MR element 6 and the bottom shield layer 3, and the top shield gap film 7 disposed between the MR element 6 and the return pole layer 10.

The write head includes the coil 30, the main pole 22, the waveguide, and the plasmon generator 18. The waveguide has the core 21 and the clad. The clad includes the clad layers 19, 23, and 25. The coil 30 produces a magnetic field corresponding to data to be written on the recording medium. The main pole 22 allows a magnetic flux corresponding to the magnetic field produced by the coil 30 to pass, and produces a write magnetic field for writing data on the recording medium by means of the perpendicular magnetic recording system.

Figure 4:
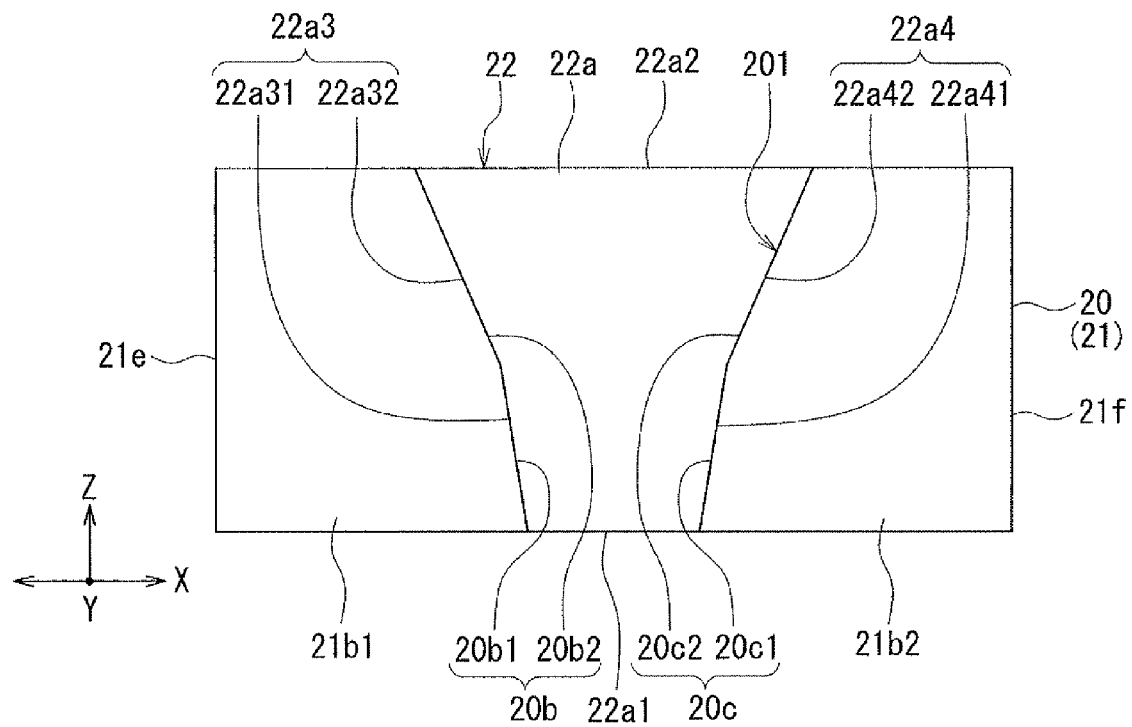
FIG. 4 is a front view showing a main pole and an accommodation layer of the thermally-assisted magnetic recording head according to the first embodiment of the invention.
Figure 5:
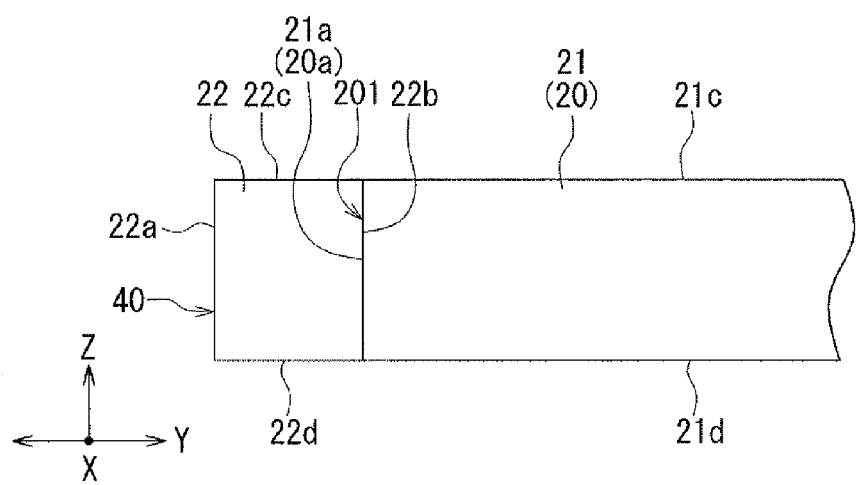
FIG. 5 is a cross-sectional view of the main pole and the accommodation layer of the thermally-assisted magnetic recording head according to the first embodiment of the invention.

The write head further includes an accommodation layer including an accommodation part that accommodates the main pole 22. In the present embodiment, the accommodation layer also serves as the core 21. The core 21, the main pole 22, and the accommodation layer will now be described in detail with reference to FIG. 1, FIG. 4, and FIG. 5. FIG. 4 is a front view showing the main pole 22 and the accommodation layer. FIG. 5 is a cross-sectional view of the main pole 22 and the accommodation layer. Note that FIG. 5 shows a cross section perpendicular to the medium facing surface 40 and the top surface 1a of the substrate 1.

Now, the accommodation layer will be described first. In the present embodiment, the accommodation layer is the core 21 itself, in particular. As shown in FIG. 1, FIG. 4, and FIG. 5, the accommodation layer 20 (core 21) includes an accommodation part 201 that accommodates the main pole 22. The accommodation layer 20 has wall faces 20a, 20b, and 20c that face the accommodation part 201. The shape of the accommodation part 201 is defined by the wall faces 20a, 20b, and 20c. The wall face 20a is located away from the medium facing surface 40 and defines an end of the accommodation part 201 farther from the medium facing surface 40. The wall faces 20b and 20c define two ends of the accommodation part 201 that are opposite to each other in the track width direction.

The wall face 20a is perpendicular or almost perpendicular to the top surface 1a of the substrate 1. While FIG. 5 shows an example where the wall face 20a is perpendicular to the top surface 1a of the substrate 1, the wall face 20a may be slightly inclined with respect to the direction perpendicular to the top surface 1a of the substrate 1 (the Z direction). In this case, the distance from the medium facing surface 40 to any given point on the wall face 20a may increase or decrease with increasing distance from the given point to the top surface 1a of the substrate 1. The wall face 20a may form an angle of, for example, 10° or less with respect to the direction perpendicular to the top surface 1a of the substrate 1.

The wall face 20b includes a lower part 20b1 and an upper part 20b2 that are continuous with each other. The wall face 20c includes a lower part 20c1 and an upper part 20c2 that are continuous with each other. The lower parts 20b1 and 20c1 and the upper parts 20b2 and 20c2 are all inclined with respect to the direction perpendicular to the top surface 1a of the substrate 1. In any cross section of the accommodation part 201 parallel to the medium facing surface 40, the distance between the wall faces 20b and 20c in the track width direction (the X direction) increases with increasing distance from the top surface 1a of the substrate 1. In the example shown in FIG. 1 and FIG. 4, the angle formed by the lower part 20b1 and the lower part 20c1 is smaller than the angle formed by the upper part 20b2 and the upper part 20c2. In any cross section of the accommodation part 201 parallel to the medium facing surface 40, the end closest to the top surface 1a of the substrate 1 is smaller in width in the track width direction (the X direction) than the end farthest from the top surface 1a of the substrate 1.

Next, the main pole 22 will be described. The main pole 22 has a front end face 22a located in the medium facing surface 40, a rear end face 22b opposite to the front end face 22a, a top surface 22c, a bottom surface 22d, and first and second side surfaces 22e and 22f.

The rear end face 22b is in contact with the wall face 20a of the accommodation layer 20. The shape of the rear end face 22b is defined by the wall face 20a. As previously mentioned, the wall face 20a is perpendicular or almost perpendicular to the top surface 1a of the substrate 1. The rear end face 22b is therefore also perpendicular or almost perpendicular to the top surface 1a of the substrate 1.

The first side surface 22e is in contact with the wall face 20b of the accommodation layer 20. The shape of the first side surface 22e is defined by the wall face 20b. Like the wall face 20b, the first side surface 22e includes a lower part 22e1 and an upper part 22e2 that are continuous with each other.

The second side surface 22f is in contact with the wall face 20c of the accommodation layer 20. The shape of the second side surface 22f is defined by the wall face 20c. Like the wall face 20c, the second side surface 22f includes a lower part 22f1 and an upper part 22f2 that are continuous with each other.

In any cross section of the main pole 22 parallel to the medium facing surface 40, the distance between the side surfaces 22e and 22f in the track width direction (the X direction) increases with increasing distance from the top surface 1a of the substrate 1. In the example shown in FIG. 1 and FIG. 4, the angle formed by the lower part 22e1 and the lower part 22f1 is smaller than the angle formed by the upper part 22e2 and the upper part 22f2.

The front end face 22a has a first end 22a1 closer to the top surface 1a of the substrate 1, a second end 22a2 farther from the top surface 1a of the substrate 1, and third and fourth ends 22a3 and 22a4 that are opposite to each other in the track width direction. The first end 22a1 lies at an end of the bottom surface 22d. The second end 22a2 lies at an end of the top surface 22c. The first end 22a1 is smaller than the second end 22a2 in width in the track width direction.

The third end 22a3 includes a lower part 22a31 and an upper part 22a32 that are continuous with each other. The lower part 22a31 lies at an end of the lower part 22e1 of the first side surface 22e. The upper part 22a32 lies at an end of the upper part 22e2 of the first side surface 22e.

The fourth end 22a4 includes a lower part 22a41 and an upper part 22a42 that are continuous with each other. The lower part 22a41 lies at an end of the lower part 22f1 of the second side surface 22f. The upper part 22a42 lies at an end of the upper part 22f2 of the second side surface 22f.

Next, the core 21 will be described. The core 21 has the end face 21a facing toward the medium facing surface 40 and located away from the medium facing surface 40. The core 21 further has two end faces 21b1 and 21b2 located in the medium facing surface 40, a top surface 21c, a bottom surface 21d, and two side surfaces 21e and 21f. In the present embodiment, in particular, the end face 21a also serves as the wall face 20a of the accommodation layer 20. The two end faces 21b1 and 21b2 are located on opposite sides of the front end face 22a of the main pole 22 in the track width direction. The first and second side surfaces 22e and 22f of the main pole 22 are covered with the core 21.

An example of the shape of the plasmon generator 18 will now be described with reference to FIG. 1. In the example shown in FIG. 1, the plasmon generator 18 is shaped like a triangular prism. The plasmon generator 18 has a front end face 18a located in the medium facing surface 40, a rear end face opposite to the front end face 18a, first and second inclined surfaces, and a bottom surface. The bottom surface connects the first and second inclined surfaces to each other. Each of the first and second inclined surfaces is inclined with respect to the direction perpendicular to the top surface 1a of the substrate 1.

The plasmon generator 18 further has an edge part 18e that connects the first and second inclined surfaces to each other, and a near-field light generating part 18g that is located in the medium facing surface 40 and generates near-field light. The near-field light generating part 18g lies at an end of the edge part 18e. The distance between the first and second inclined surfaces decreases toward the edge part 18e. The edge part 18e faces the bottom surface 21d of the core 21 and the bottom surface 22d of the main pole 22 at a predetermined distance from those bottom surfaces, and extends in the direction perpendicular to the medium facing surface 40 (the Y direction).

The front end face 18a is triangular in shape. One of the vertexes of the front end face 18a lies at an end of the edge part 18e. The vertex constitutes the near-field light generating part 18g.

The length of the plasmon generator 18 in the direction perpendicular to the medium facing surface 40 (the Y direction) is greater than the length of the front end face 18a in the direction perpendicular to the top surface 1a of the substrate 1 (the Z direction). The width and the Z-direction length of the bottom end of the front end face 18a are both equal to or smaller than the wavelength of the light to propagate through the core 21, and fall within the range of 100 to 500 nm, for example. The length of the plasmon generator 18 in the Y direction falls within the range of 0.25 to 2.5 μm, for example. The distance between the edge part 18e and the bottom surface 21d of the core 21 falls within the range of 10 to 50 nm, for example.

The shape of the plasmon generator 18 is not limited to the foregoing example that has been described with reference to FIG. 1.

Now, the principle of generation of near-field light in the present embodiment and the principle of thermally-assisted magnetic recording using the near-field light will be described in detail. Laser light emitted from a not-shown laser diode enters the core 21. As shown in FIG. 2, the laser light 50 propagates through the core 21 toward the medium facing surface 40, and reaches the vicinity of the plasmon generator 18. The laser light 50 is then totally reflected at the bottom surface 21d of the core 21. This generates evanescent light permeating into the clad layer 19. As a result, the evanescent light and the collective oscillations of charges on the edge part 18e and its vicinity in the plasmon generator 18, i.e., surface plasmons, are coupled with each other to excite a system of surface plasmon polaritons. In this way, surface plasmons are excited on the edge part 18e and its vicinity in the plasmon generator 18.

The surface plasmons excited on the plasmon generator 18 propagate along the edge part 18e toward the near-field light generating part 18g. Consequently, the surface plasmons concentrate at the near-field light generating part 18g, and the near-field light generating part 18g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 22 for data writing.

Now, with reference to FIG. 2 and FIG. 3, a description will be given of a method of manufacturing the thermally-assisted magnetic recording head according to the present embodiment. The method of manufacturing the thermally-assisted magnetic recording head according to the present embodiment includes the steps of forming components of a plurality of thermally-assisted magnetic recording heads other than the substrates 1 on a substrate that includes portions to become the substrates 1 of the plurality of thermally-assisted magnetic recording heads, thereby fabricating a substructure that includes a plurality of rows of pre-head portions that are to later become the plurality of thermally-assisted magnetic recording heads; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 40.

The method of manufacturing the thermally-assisted magnetic recording head according to the present embodiment will now be described in more detail with attention focused on a single thermally-assisted magnetic recording head. In the method of manufacturing the thermally-assisted magnetic recording head according to the present embodiment, the insulating layer 2 is formed on the substrate 1 first. Next, the bottom shield layer 3 is formed on the insulating layer 2. Next, the insulating layer 4 is formed to cover the bottom shield layer 3. The insulating layer 4 is then polished by, for example, chemical mechanical polishing (hereinafter referred to as CMP), until the bottom shield layer 3 is exposed.

Next, the bottom shield gap film 5 is formed over the bottom shield layer 3 and the insulating layer 4. Next, the MR element 6 and not-shown two leads connected to the MR element 6 are formed on the bottom shield gap film 5. Next, the top shield gap film 7 is formed to cover the MR element 6 and the leads. Next, the return pole layer 10 is formed on the top shield gap film 7. Next, the insulating layer 11 is formed to cover the return pole layer 10. The insulating layer 11 is then polished by, for example, CMP, until the return pole layer 10 is exposed.

Next, the shield layer 12 and the coupling layer 13 are formed on the return pole layer 10. Next, the insulating layer 14 is formed to cover the return pole layer 10, the shield layer 12 and the coupling layer 13. The insulating layer 14 is then polished by, for example, CMP, until the shield layer 12 and the coupling layer 13 are exposed.

Next, the coupling layer 15 is formed on the coupling layer 13. Next, the insulating layer 16 is formed to cover the coupling layer 15. The insulating layer 16 is then polished by, for example, CMP, until the coupling layer 15 is exposed. The top surfaces of the coupling layer 15 and the insulating layer 16 are thereby made even with each other.

Next, the plasmon generator 18 is formed on the insulating layer 16. The respective first layers of the coupling portions 17A and 17B are formed on the coupling layer 15. Next, the clad layer 19 is formed to cover the plasmon generator 18 and the respective first layers of the coupling portions 17A and 17B. The clad layer 19 is then polished by, for example, CMP, until the respective first layers of the coupling portions 17A and 17B are exposed.

Next, the respective second layers of the coupling portions 17A and 17B are formed on the respective first layers of the coupling portions 17A and 17B. The core 21, the main pole 22, and the clad layer 23 are formed on the clad layer 19. The step of forming the core 21, the main pole 22, and the clad layer 23 will be described in detail later.

Next, the respective third layers of the coupling portions 17A and 17B are formed on the respective second layers of the coupling portions 17A and 17B. Next, the clad layer 25 is formed to cover the core 21 and the respective third layers of the coupling portions 17A and 17B. The clad layer 25 is then polished by, for example, CMP, until the respective third layers of the coupling portions 17A and 17B are exposed. Next, the clad layer 25 is selectively etched to form therein an accommodation part for accommodating the coupling layer 24. The coupling layer 24 is then formed in the accommodation part of the clad layer 25.

Next, the insulating layer 26 is formed over the entire top surface of the stack. The insulating layer 26 is then selectively etched to form therein an opening for exposing the top surface of the coupling layer 24 and openings for exposing the top surfaces of the respective third layers of the coupling portions 17A and 17B. Next, the coupling layer 27 is formed on the coupling layer 24. The coupling layer 28 is formed over the respective third layers of the coupling portions 17A and 17B. Next, the coil 30 is formed on the insulating layer 26. Next, the insulating layer 31 is formed around the coil 30 and the coupling layers 27 and 28 and in the space between every adjacent turns of the coil 30. Next, the insulating layer 32 is formed over the entire top surface of the stack. The insulating layer 32 is then polished by, for example, CMP, until the coupling layers 27 and 28 are exposed. The top surfaces of the coupling layers 27 and 28 and the insulating layer 32 are thereby made even with each other.

Next, the yoke layer 33 is formed over the coupling layers 27 and 28 and the insulating layer 32. Next, the protection layer 35 is formed to cover the yoke layer 33. Wiring, terminals, and other components are then formed on the top surface of the protection layer 35.

When the substructure is completed thus, the substructure is cut to separate the plurality of pre-head portions from each other, followed by the polishing of the medium facing surface 40 and the fabrication of flying rails etc. This completes the thermally-assisted magnetic recording head.

The step of forming the core 21, the main pole 22, and the clad layer 23 will now be described in detail with reference to FIG. 6A to FIG. 11A and FIG. 6B to FIG. 11B. FIG. 6A to FIG. 11A and FIG. 6B to FIG. 11B each show a stack of layers in the process of manufacturing the thermally-assisted magnetic recording head. FIG. 6A to FIG. 11A each show a cross section of the stack taken at the position where the medium facing surface 40 is to be formed. FIG. 6B to FIG. 11B each show a cross section of the stack perpendicular to the medium facing surface 40 and the top surface 1a of the substrate 1. The step of forming the core 21 and the main pole 22 corresponds to the step of forming the accommodation layer and the main pole in the method of manufacturing the thermally-assisted magnetic recording head of the present invention, and also corresponds to the method of forming the main pole of the present invention.

Figure 6A:
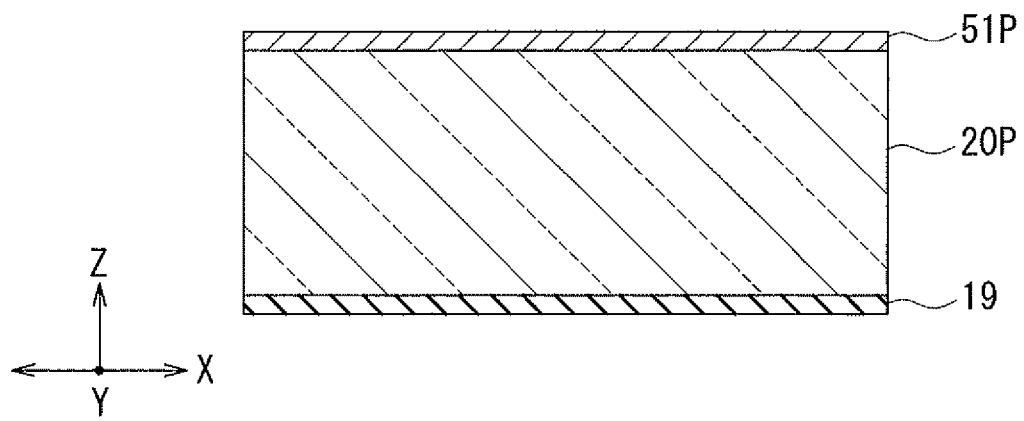
FIG. 6A and FIG. 6B are cross-sectional views showing a step of a method of manufacturing the thermally-assisted magnetic recording head according to the first embodiment of the invention.
Figure 6B:
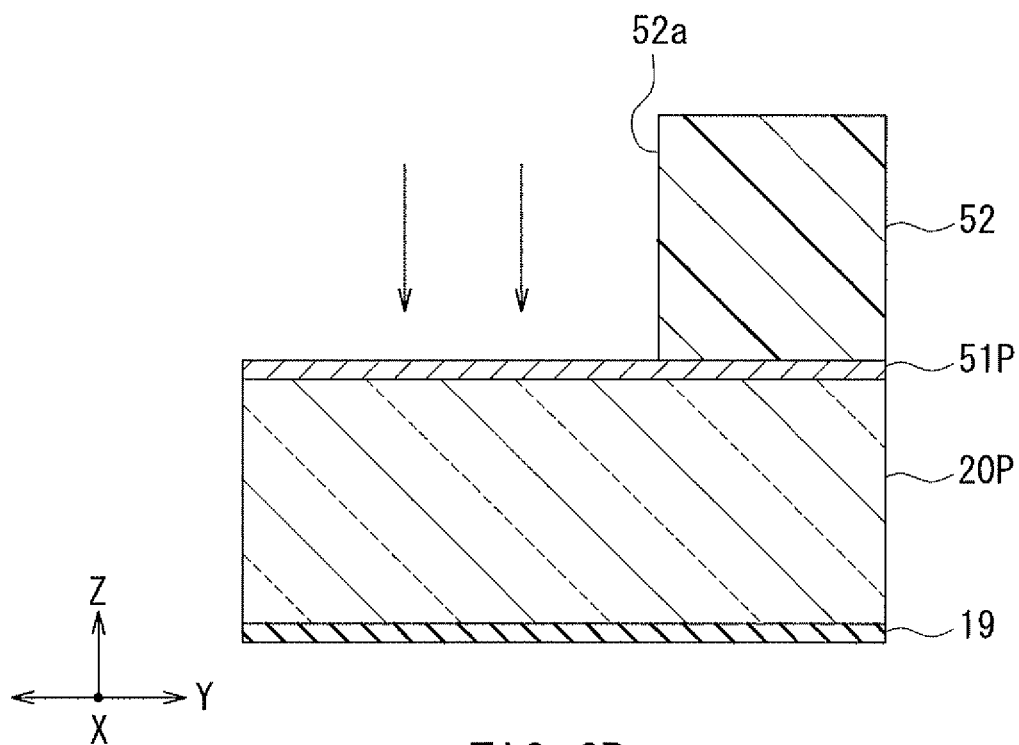

FIG. 6A and FIG. 6B show a step that follows the formation of the clad layer 19. In this step, first, an initial accommodation layer 20P having a top surface is formed on the clad layer 19. The initial accommodation layer 20P will be provided with the accommodation part 201 and the wall faces 20a, 20b, and 20c later, and will thereby become the accommodation layer 20 (core 21). On the top surface of the initial accommodation layer 20P, formed is a mask material layer 51P. The mask material layer 51P may be made of C, NiFe, NiCr, or Ru, for example. Next, an etching mask 52 is formed on an area of the top surface of the mask material layer 51P away from the position where the medium facing surface 40 is to be formed. The etching mask 52 is formed by patterning a photoresist layer by photolithography. The etching mask 52 has a sidewall 52a facing toward the position where the medium facing surface 40 is to be formed.

Using the etching mask 52, the mask material layer 51P is then etched by ion beam etching, for example. Arrows in FIG. 6B indicate ion beams. The mask material layer 51P thereby becomes an etching mask 51. The etching mask 52 is then removed.

The etching mask 51 has an end 51a whose position is defined by the sidewall 52a. The end 51a is at a distance from the position where the medium facing surface 40 is to be formed, the distance being equal to the distance between the wall face 20a of the accommodation layer 20 and the medium facing surface 40 to be formed later. The etching mask 51 is to be used for defining the position of the wall face 20a of the accommodation layer 20 later. The etching mask 51 corresponds to the third etching mask of the present invention.

Figure 7A:
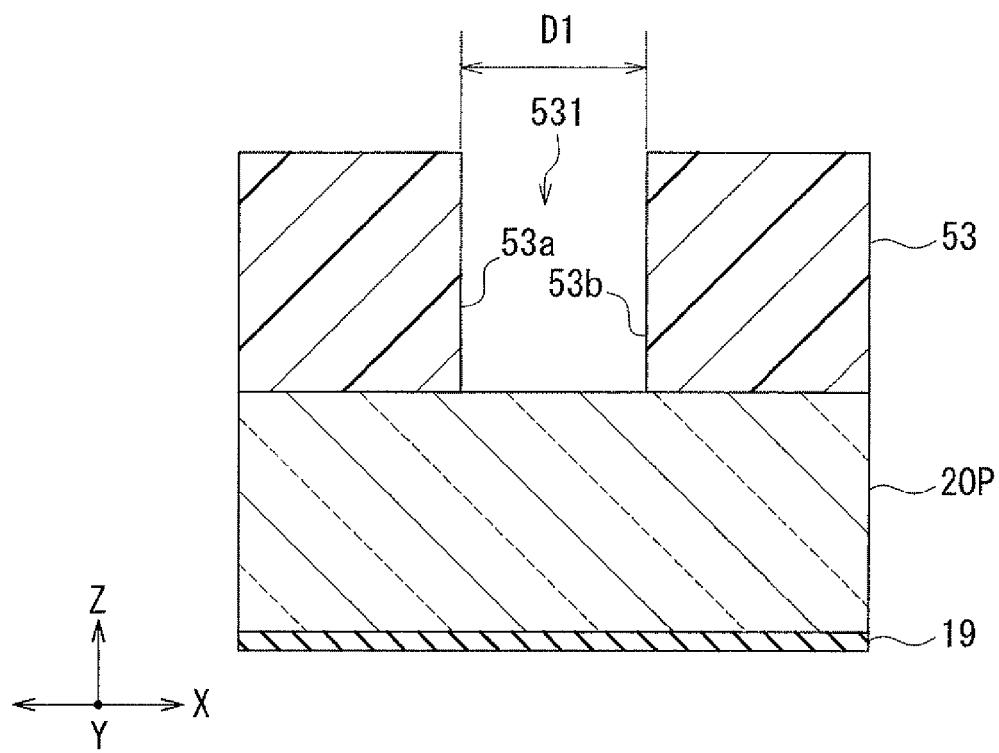
FIG. 7A and FIG. 7B are cross-sectional views showing a step that follows the step shown in FIG. 6A and FIG. 6B.
Figure 7B:
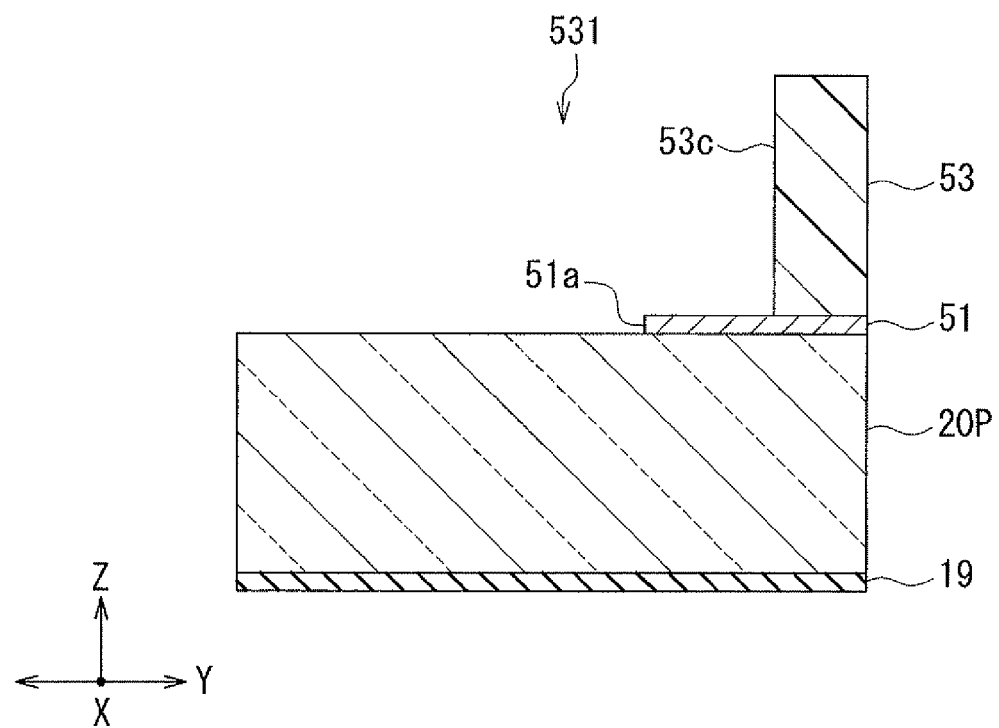

FIG. 7A and FIG. 7B show the next step. In this step, an etching mask 53 is formed over the top surfaces of the initial accommodation layer 20P and the etching mask 51. The etching mask 53 has a first opening 531 that opens at least across an area from the end 51a of the etching mask 51 to the position where the medium facing surface 40 is to be formed. The etching mask 53 is formed by patterning a photoresist layer by photolithography. The etching mask 53 has sidewalls 53a, 53b, and 53c that face the first opening 531. The sidewalls 53a and 53b are opposed to each other and are at a first distance D1 from each other in the track width direction (the X direction). The sidewall 53c faces toward the position where the medium facing surface 40 is to be formed. The sidewall 53c is located farther from the position where the medium facing surface 40 is to be formed, than is the end 51a of the etching mask 51. The etching mask 53 corresponds to the first etching mask of the present invention. The sidewall 53a corresponds to the first sidewall of the present invention, and the sidewall 53b corresponds to the second sidewall of the present invention.

Figure 8A:
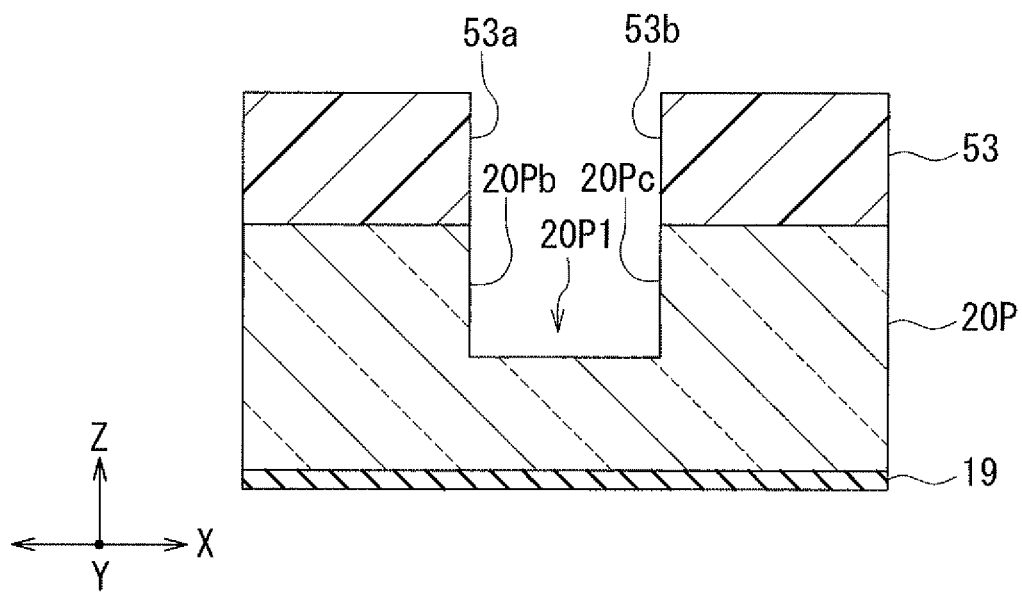
FIG. 8A and FIG. 8B are cross-sectional views showing a step that follows the step shown in FIG. 7A and FIG. 7B.
Figure 8B:
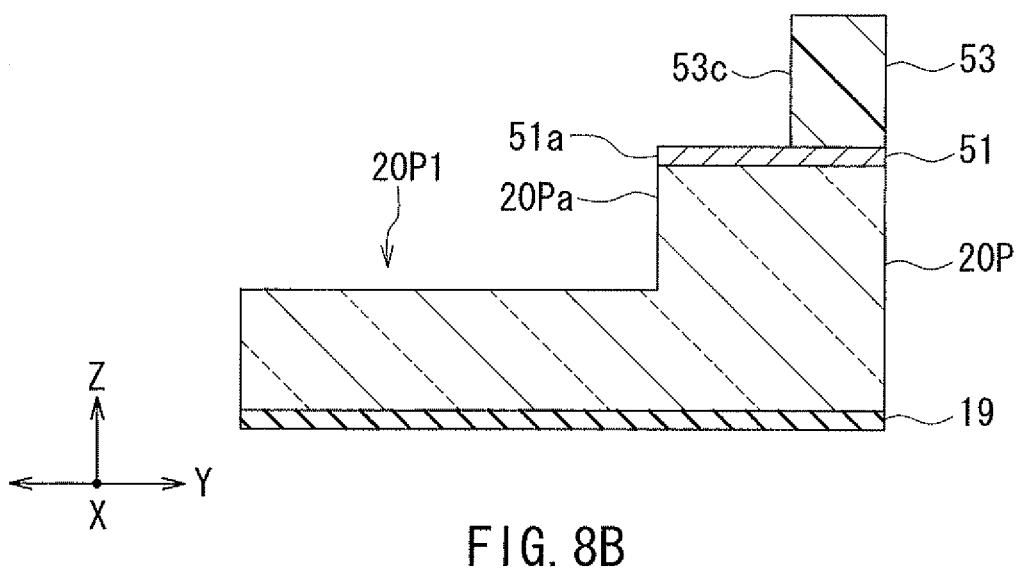

FIG. 8A and FIG. 8B show the next step. In this step, first, the initial accommodation layer 20P is etched by reactive ion etching (hereinafter referred to as RIE), using the etching masks 51 and 53. A groove 20P1 is thereby formed in the initial accommodation layer 20P. The groove 20P1 is formed such that its bottom does not reach the top surface of the clad layer 19. This step will be referred to as a first etching step. A gas containing $Cl_2$ and $BCl_3$, for example, is used as the etching gas. Next, the etching mask 53 is removed.

The first etching step provides the initial accommodation layer 20P with wall faces 20Pa, 20Pb, and 20Pc that face the groove 20P1. The wall faces 20Pa, 20Pb, and 20Pc are all perpendicular or almost perpendicular to the top surface 1a of the substrate 1. The position of the wall face 20Pa is defined by the end 51a of the etching mask 51. The positions of the wall faces 20Pb and 20Pc are defined by the sidewalls 53a and 53b of the etching mask 53, respectively.

Figure 9A:
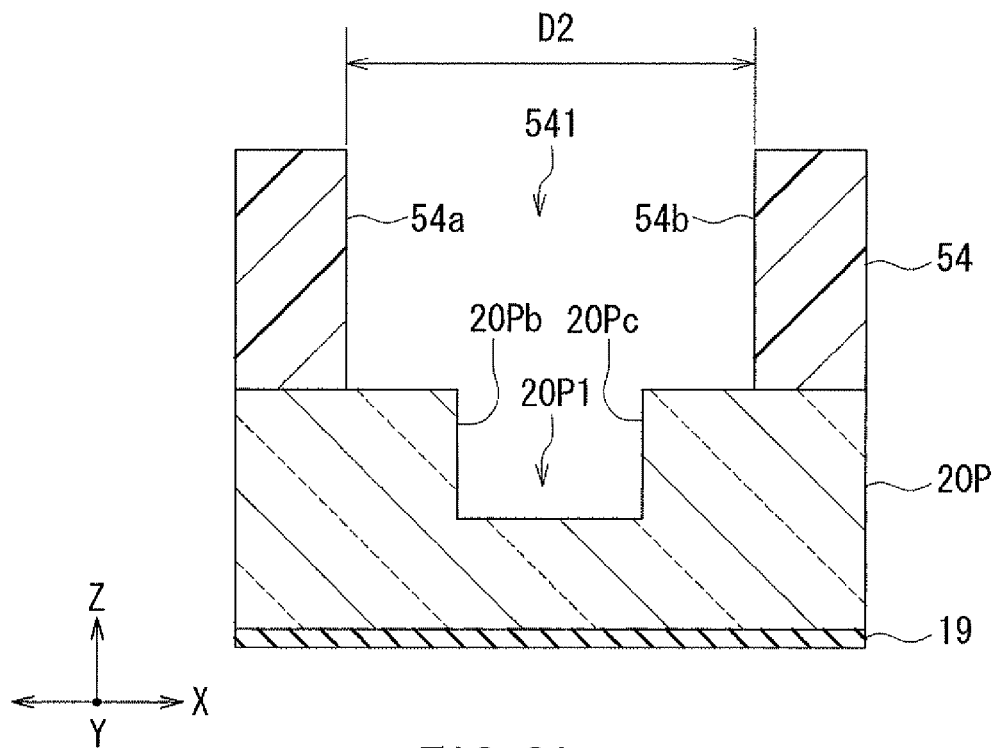
FIG. 9A and FIG. 9B are cross-sectional views showing a step that follows the step shown in FIG. 8A and FIG. 8B.
Figure 9B:
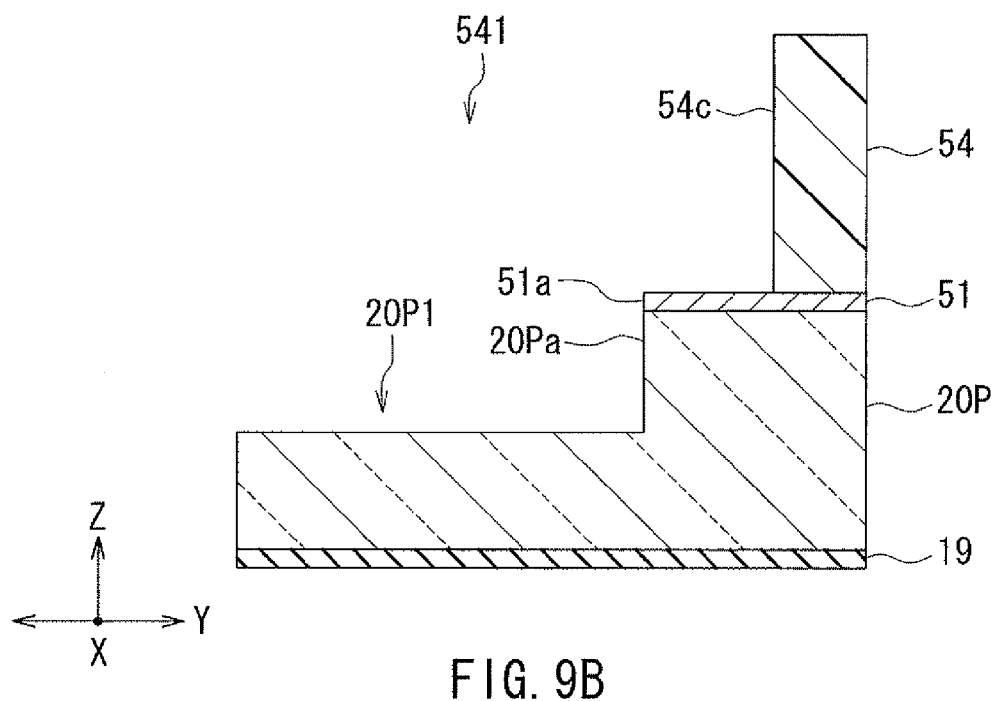

FIG. 9A and FIG. 9B show the next step. In this step, an etching mask 54 is formed over the top surfaces of the initial accommodation layer 20P and the etching mask 51. The etching mask 54 has a second opening 541 that opens at least across the area from the end 51a of the etching mask 51 to the position where the medium facing surface 40 is to be formed. The etching mask 54 is formed by patterning a photoresist layer by photolithography. The etching mask 54 has sidewalls 54a, 54b, and 54c that face the second opening 541. The sidewalls 54a and 54b are opposed to each other and are at a second distance D2 from each other in the track width direction (the X direction), the second distance D2 being greater than the first distance D1. The sidewall 54c faces toward the position where the medium facing surface 40 is to be formed. The sidewall 54c is located farther from the position where the medium facing surface 40 is to be formed, than is the end 51a of the etching mask 51. The etching mask 54 corresponds to the second etching mask of the present invention. The sidewall 54a corresponds to the third sidewall of the present invention, and the sidewall 54b corresponds to the fourth sidewall of the present invention.

Figure 10A:
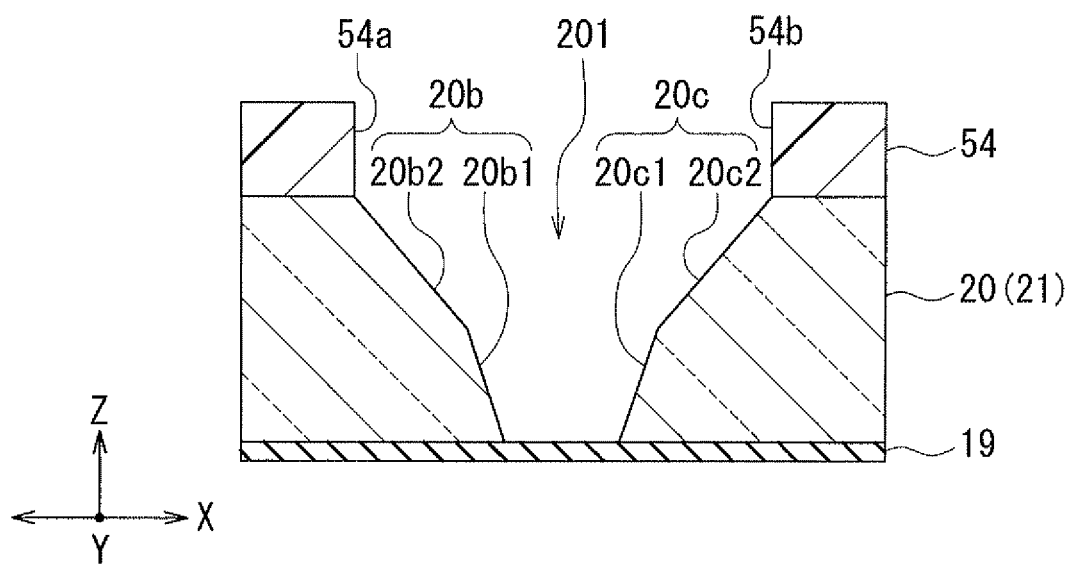
FIG. 10A and FIG. 10B are cross-sectional views showing a step that follows the step shown in FIG. 9A and FIG. 9B.
Figure 10B:
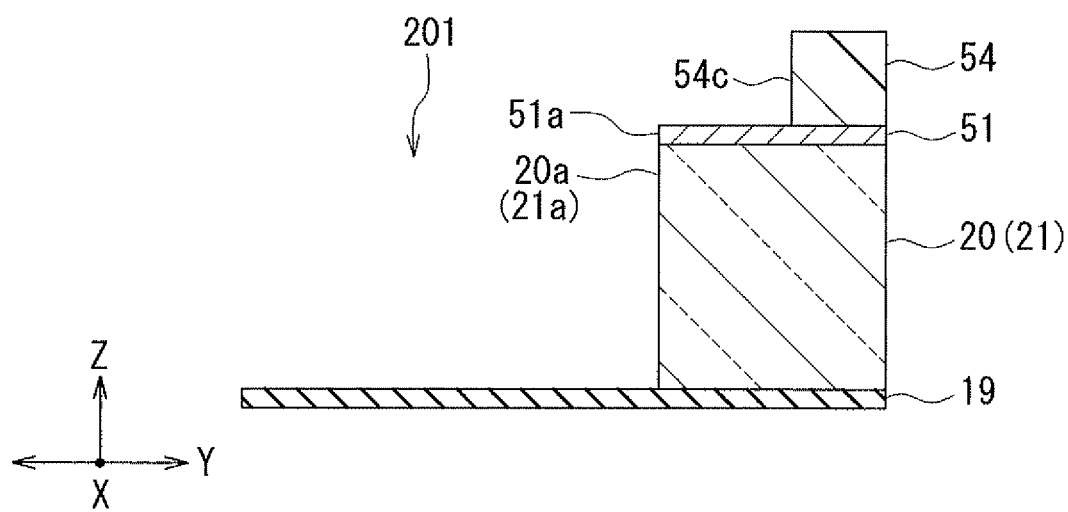

FIG. 10A and FIG. 10B show the next step. In this step, first, a part of the initial accommodation layer 20P including the groove 20P1 is etched by RIE using the etching masks 51 and 54 so that the initial accommodation layer 20P becomes the accommodation layer 20 (core 21) and the groove 20P1 becomes the accommodation part 201. This etching is performed until the top surface of the clad layer 19 is exposed. This step will be referred to as a second etching step. Next, the etching mask 54 is removed.

The second etching step provides the accommodation layer 20 with the wall faces 20a, 20b, and 20c that face the accommodation part 201. The sidewalls 54a and 54b of the etching mask 54 are located outside of the edges of the groove 20P1 in the track width direction (the X direction). Accordingly, a greater amount of etching gas is supplied to the part of the top surface of the initial accommodation layer 20P exposed without being covered by the etching mask 54 and to the part in the vicinity of the top end of the groove 20P1, than to the bottom of the groove 20P1. Consequently, in the second etching step, the etching rate in the exposed part of the top surface of the initial accommodation layer 20P and the part in the vicinity of the top end of the groove 20P1 is higher than the etching rate in the bottom of the groove 20P1. As a result, as shown in FIG. 10A, the second etching step forms the wall faces 20b and 20c such that the distance between the wall faces 20b and 20c in the track width direction (the X direction) increases with increasing distance from the top surface 1a of the substrate 1. Accordingly, in any cross section of the accommodation part 201 parallel to the medium facing surface 40, the end closest to the top surface 1a of the substrate 1 is smaller in width in the track width direction than the end farthest from the top surface 1a of the substrate 1.

In the second etching step, the end 51a of the etching mask 51 lies immediately above the wall face 20Pa. The second etching step does not etch the part of the top surface of the initial accommodation layer 20P covered by the etching mask 51. Accordingly, in the second etching step, the etching of the initial accommodation layer 20P proceeds to below the end 51a, i.e., below the wall face 20Pa. As a result, the wall face 20a that is perpendicular or almost perpendicular to the top surface 1a of the substrate 1 is formed immediately below the end 51a of the etching mask 51. As such, the etching mask 51 is used to define the position of the wall face 20a.

The second etching step uses a gas containing $Cl_2$ and $BCl_3$ as the etching gas, as does the first etching step. If the initial accommodation layer 20P is formed of tantalum oxide or silicon oxynitride, a gas containing $CF_4$ may be used instead of a gas containing $Cl_2$ and $BCl_3$. A gas containing $CF_4$ is suitable as the etching gas if the initial accommodation layer 20P is formed of silicon oxynitride, in particular.

The ratio of the etching depth of the initial accommodation layer 20P in the first etching step to the total etching depth of the initial accommodation layer 20P in the first and second etching steps ranges from 30% to 70%, for example.

In the first etching step, the etching mask 53 may be etched in such a manner that the distance between the sidewalls 53a and 53b in the track width direction (the X direction) gradually increases with time. In this case, the initial accommodation layer 20Pc is formed such that the distance between the wall faces 20Pb and 20Pc in the track width direction increases with increasing distance from the top surface 1a of the substrate 1.

Likewise, in the second etching step, the etching mask 54 may be etched in such a manner that the distance between the sidewalls 54a and 54b in the track width direction (the X direction) gradually increases with time. This increases the inclination of the wall faces 20b and 20c of the accommodation layer 20 with respect to the direction perpendicular to the top surface 1a of the substrate 1.

Figure 11A:
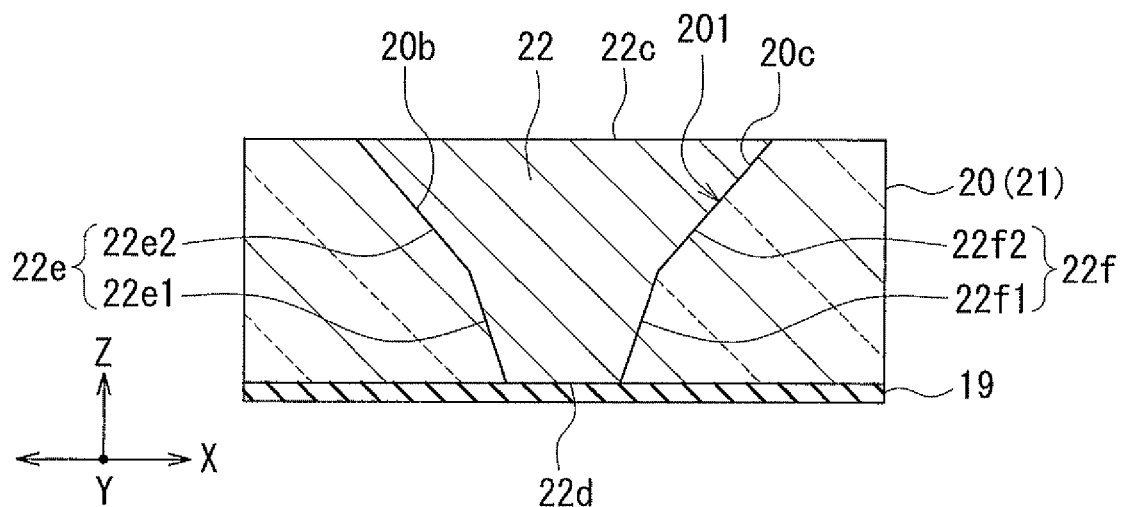
FIG. 11A and FIG. 11B are cross-sectional views showing a step that follows the step shown in FIG. 10A and FIG. 10B.
Figure 11B:
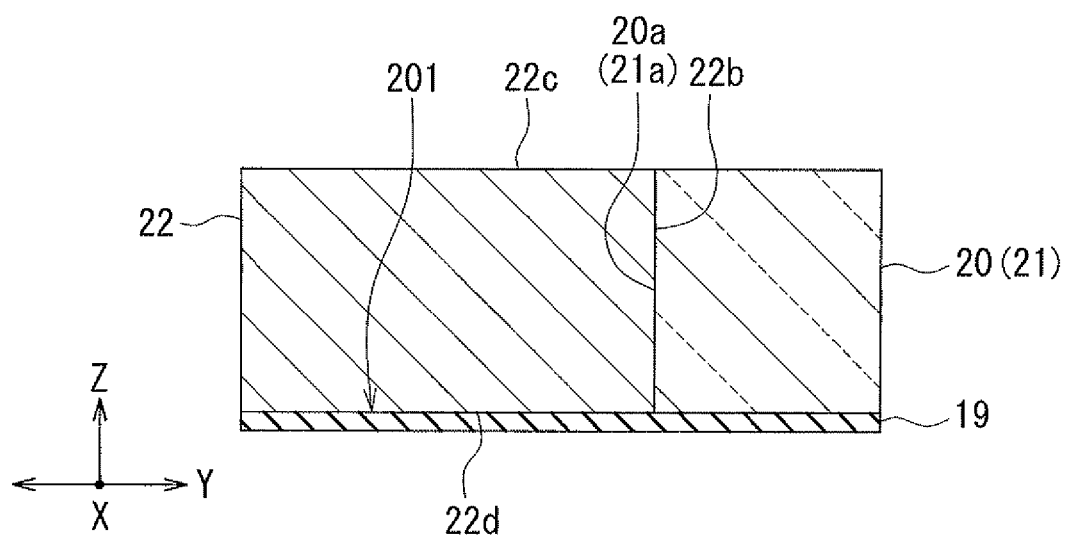

FIG. 11A and FIG. 11B show the next step. In this step, first, a magnetic layer that is to become the main pole 22 later is formed in the accommodation part 201 by plating, for example. The magnetic layer is formed to have a top surface at a level higher than the top surface of the etching mask 51. Next, the clad layer 23 is formed over the entire top surface of the stack. The clad layer 23 is formed to have a top surface at a level higher than the top surface of the etching mask 51. The magnetic layer, the clad layer 23 and the etching mask 51 are then polished by, for example, CMP, until the top surface of the accommodation layer 20 is exposed. The magnetic layer thereby becomes the main pole 22.

The rear end face 22b of the main pole 22 is formed along the wall face 20a of the accommodation layer 20. The shape of the rear end face 22b is thereby defined. Likewise, the side surfaces 22e and 22f of the main pole 22 are formed along the wall faces 20b and 20c of the accommodation layer 20. The shapes of the side surfaces 22e and 22f are thereby defined.

As has been described, in the thermally-assisted magnetic recording head according to the present embodiment, the core 21 has the end face 21a facing toward the medium facing surface 40 and located away from the medium facing surface 40. The core 21 is located farther from the top surface 1a of the substrate 1 than is the plasmon generator 18. The main pole 22 has the front end face 22a and the rear end face 22b, and is interposed between the end face 21a of the core 21 and the medium facing surface 40. The front end face 22a of the main pole 22 has such a shape that the first end 22a1 closer to the top surface 1a of the substrate 1 is smaller in width in the track width direction than the second end 22a2 farther from the top surface 1a of the substrate 1. Such a configuration of the present embodiment allows a large write magnetic field to be generated locally from the part of the front end face 22a of the main pole 22 closer to the top surface 1a of the substrate 1, i.e., the part closer to the plasmon generator 18.

In the present embodiment, the main pole 22 is accommodated in the accommodation part 201 of the accommodation layer 20. The accommodation layer 20 has the wall face 20a that defines the shape of the rear end face 22b of the main pole 22. The shape of the rear end face 22b of the main pole 22 is defined by the wall face 20a. Since the wall face 20a is perpendicular or almost perpendicular to the top surface 1a of the substrate 1, the rear end face 22b is also perpendicular or almost perpendicular to the top surface 1a of the substrate 1. Therefore, as compared with a case where the rear end face 22b of the main pole 22 is inclined with respect to the direction perpendicular to the top surface 1a of the substrate 1, the present embodiment allows the wall face 20a of the accommodation layer 20 in contact with the rear end face 22b, i.e., the end face 21a of the core 21, to be brought closer to the medium facing surface 40 and thereby allows the plasmon generator 18 to excite surface plasmons near the medium facing surface 40. The present embodiment also makes it possible to reduce the contact area between the end face 21a of the core 21 and the rear end face 22b of the main pole 22, thereby decreasing the ratio of the amount of light absorbed by the main pole 22 to the total amount of light propagating through the core 21. As a result, according to the present embodiment, it is possible to efficiently transform the light propagating through the core 21 into near-field light.

In the step of forming the accommodation layer 20 and the main pole 22 in the method of manufacturing the thermally-assisted magnetic recording head according to the present embodiment and in the method of forming the main pole 22 according to the present embodiment, the initial accommodation layer 20P having a top surface is formed first. Next, the etching mask 51 is formed on the top surface of the initial accommodation layer 20P. Next, the etching mask 53 having the first opening 531 is formed over the top surfaces of the initial accommodation layer 20P and the etching mask 51. The etching mask 53 has the sidewalls 53a and 53b facing the first opening 531. The sidewalls 53a and 53b are opposed to each other and are at the first distance D1 from each other in the track width direction (the X direction). Next, performed is the first etching step of etching the initial accommodation layer 20P by RIE using the etching masks 51 and 53 to thereby form the groove 20P1 in the initial accommodation layer 20P. Next, the etching mask 54 having the second opening 541 is formed over the top surfaces of the initial accommodation layer 20P and the etching mask 51. The etching mask 54 has the sidewalls 54a and 54b facing the second opening 541. The sidewalls 54a and 54b are opposed to each other and are at the second distance D2, which is greater than the first distance D1, from each other in the track width direction. Next, performed is the second etching step of etching a part of the initial accommodation layer 20P including the groove 20P1 by RIE using the etching masks 51 and 54 so that the initial accommodation layer 20P becomes the accommodation layer 20 and the groove 20P1 becomes the accommodation part 201.

Such a method allows the accommodation part 201 to be formed so that the wall face 20a is perpendicular or almost perpendicular to the top surface 1a of the substrate 1, and in any cross section of the accommodation part 201 parallel to the medium facing surface 40, the end closest to the top surface 1a of the substrate 1 is smaller in width in the track width direction than the end farthest from the top surface 1a of the substrate 1, as described above. The main pole 22 can be easily shaped as desired by forming the main pole 22 in the accommodation part 201 of such a shape. That is, the main pole 22 can be formed into such a shape that the rear end face 22b is perpendicular or almost perpendicular to the top surface 1a of the substrate 1 and the first end 22a1 of the front end face 22a is smaller in width in the track width direction than the second end 22a2 of the front end face 22a.

In the present embodiment, the etching mask 51 defines the position of the wall face 20a of the accommodation layer 20. However, without the etching mask 51, the sidewall 53c of the etching mask 53 and the sidewall 54c of the etching mask 54 may be used to define the position of the wall face 20a by aligning the position of the sidewall 53c and the position of the sidewall 54c with the position at which the wall face 20a is to be formed.

The effects of the present embodiment will now be described with reference to a method of manufacturing a thermally-assisted magnetic recording head of a comparative example. First, the method of manufacturing the thermally-assisted magnetic recording head of the comparative example will be described with reference to FIG. 12A to FIG. 14A and FIG. 12B to FIG. 14B. FIG. 12A to FIG. 14A and FIG. 12B to FIG. 14B each show a stack of layers in the process of manufacturing the thermally-assisted magnetic recording head of the comparative example. FIG. 12A to FIG. 14A each show a cross section of the stack taken at the position where the medium facing surface 40 is to be formed. FIG. 12B to FIG. 14B each show a cross section of the stack perpendicular to the medium facing surface 40 and the top surface 1a of the substrate 1.

Figure 12A:
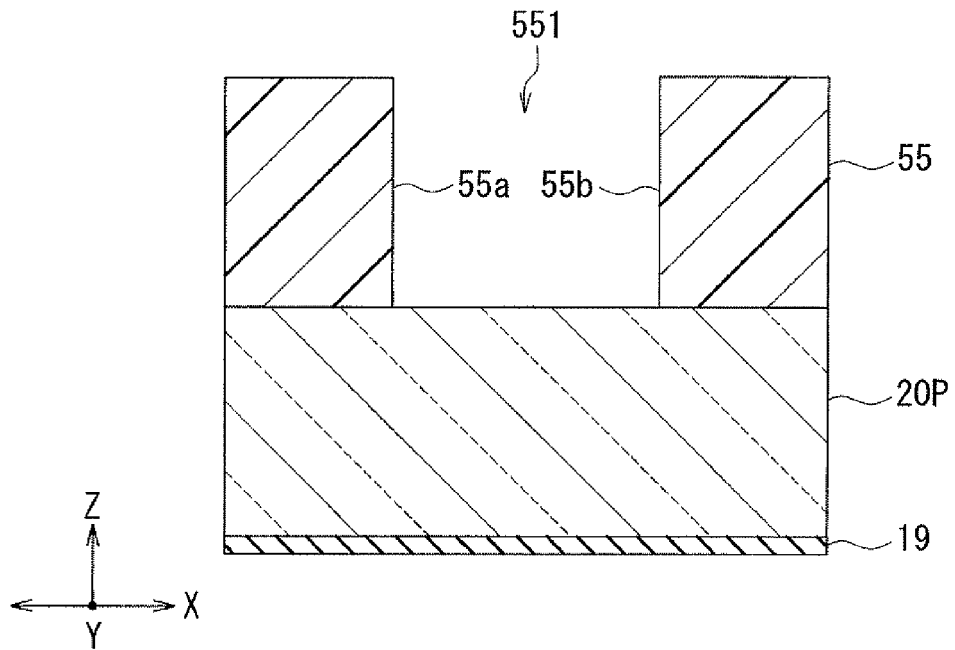
FIG. 12A and FIG. 12B are cross-sectional views showing a step of a method of manufacturing a thermally-assisted magnetic recording head of a comparative example.
Figure 12B:
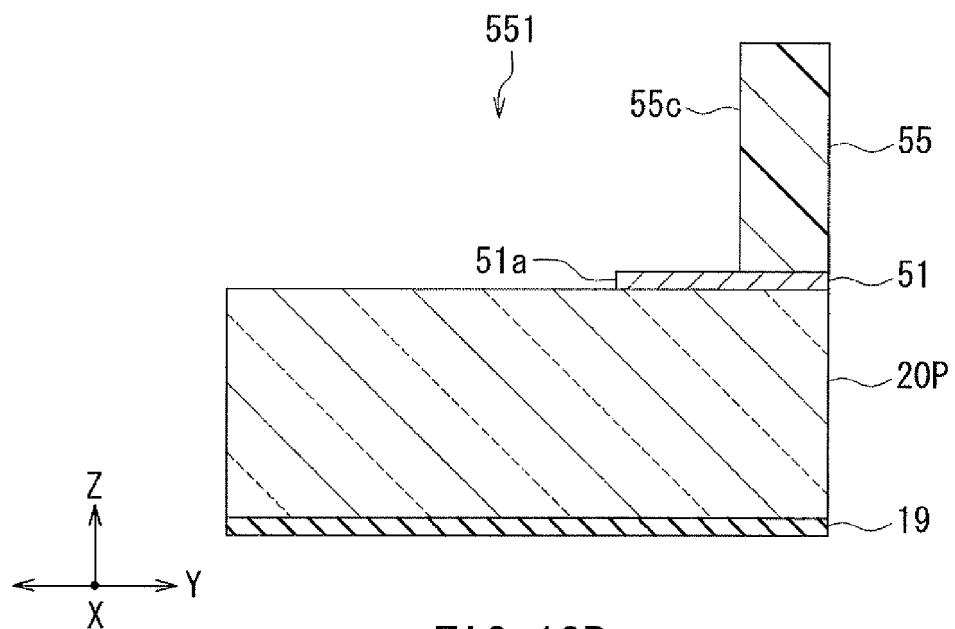

The method of manufacturing the thermally-assisted magnetic recording head of the comparative example is the same as the method of manufacturing the thermally-assisted magnetic recording head according to the present embodiment shown in FIG. 6A and FIG. 6B up to the step of forming the etching mask 51. FIG. 12A and FIG. 12B show a step after the formation of the etching mask 51. In this step, an etching mask 55 having an opening 551 is formed over the top surfaces of the initial accommodation layer 20P and the etching mask 51. The etching mask 55 has sidewalls 55a, 55b, and 55c that face the opening 551. The sidewalls 55a and 55b are opposed to each other and are at a predetermined distance from each other in the track width direction (the X direction). The sidewall 55c faces toward the position where the medium facing surface 40 is to be formed. The sidewall 55c is located farther from the position where the medium facing surface 40 is to be formed, than is the end 51a of the etching mask 51.

In the manufacturing method of the comparative example, the initial accommodation layer 20P is etched by, for example, RIE using the etching masks 51 and 55 so that the initial accommodation layer 20P becomes the accommodation layer 20. This step will be referred to as an etching step of the comparative example.

Figure 13A:
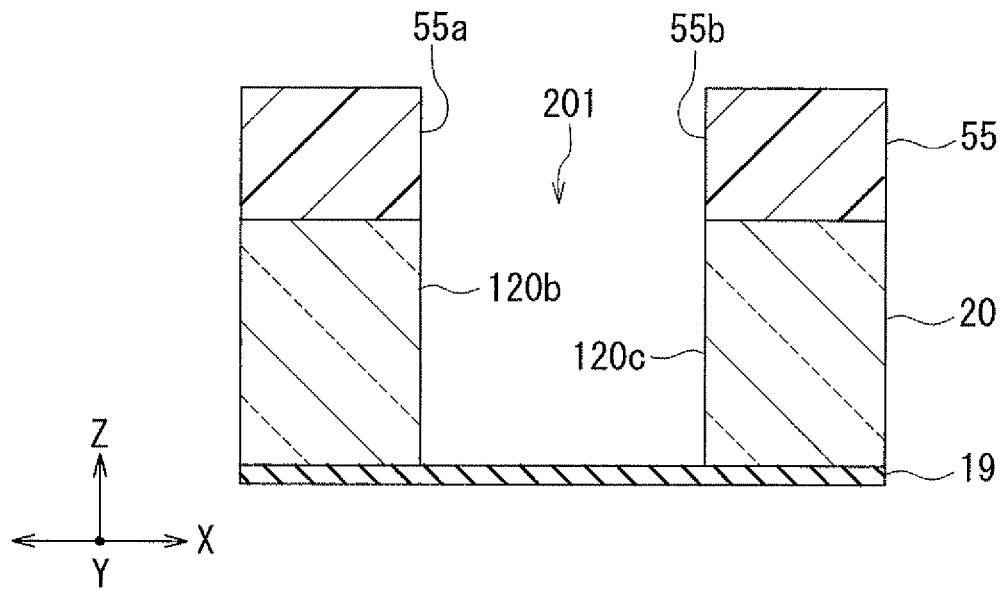
FIG. 13A and FIG. 13B are cross-sectional views showing a first example of a step that follows the step shown in FIG. 12A and FIG. 12B.
Figure 13B:
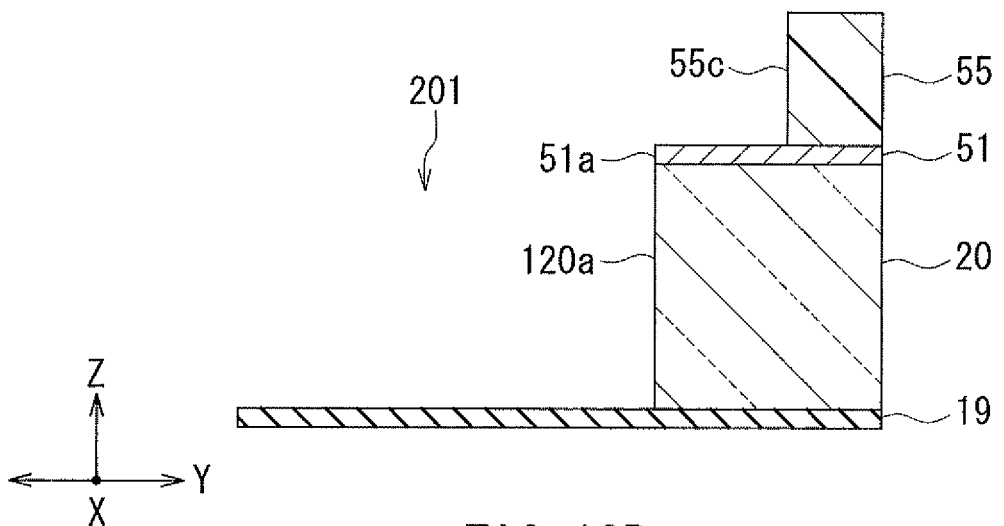

FIG. 13A and FIG. 13B show a first example of the etching step of the comparative example. In the first example, the initial accommodation layer 20P is etched to form wall faces 120a, 120b, and 120c of the accommodation layer 20 that face the accommodation part 201 and that are perpendicular or almost perpendicular to the top surface 1a of the substrate 1. In the first example, a gas containing $Cl_2$ and $BCl_3$, for example, is used as the etching gas. The wall faces 120a, 120b, and 120c correspond to the wall faces 20a, 20b, and 20c of the present embodiment, respectively.

Figure 14A:
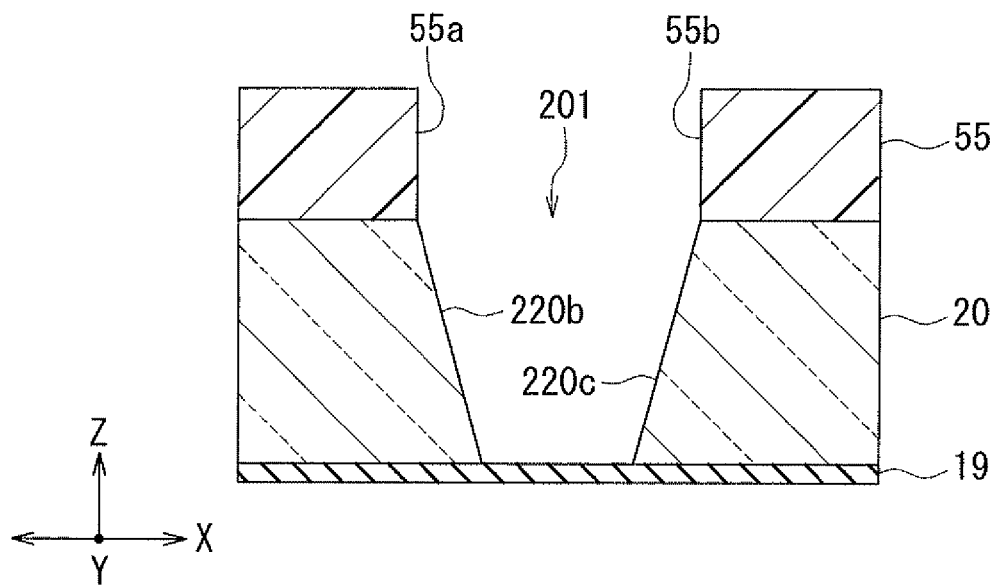
FIG. 14A and FIG. 14B are cross-sectional views showing a second example of a step that follows the step shown in FIG. 12A and FIG. 12B.
Figure 14B:
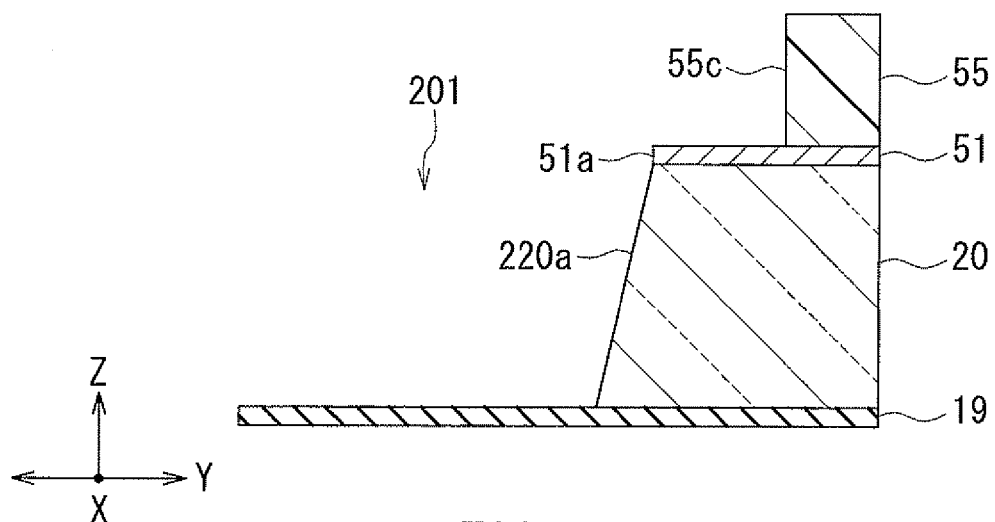

FIG. 14A and FIG. 14B show a second example of the etching step of the comparative example. In the second example, the initial accommodation layer 20P is taper-etched to form wall faces 220a, 220b, and 220c of the accommodation layer 20 that face the accommodation part 201 and that are inclined with respect to the direction perpendicular to the top surface 1a of the substrate 1. In the second example, a gas containing $Cl_2$ and $BCl_3$, and at least one of $N_2$ and $CF_4$, for example, is used as the etching gas. The wall faces 220a, 220b, and 220c correspond to the wall faces 20a, 20b, and 20c of the present embodiment, respectively.

According to the manufacturing method of the comparative example, the wall faces of the accommodation layer 20 facing the accommodation part 201 are all perpendicular or almost perpendicular to the top surface 1a of the substrate 1 or all inclined with respect to the direction perpendicular to the top surface 1a of the substrate 1. Thus, the comparative example cannot form the accommodation part 201 into such a shape that the wall face 20a is perpendicular or almost perpendicular to the top surface 1a of the substrate 1, and in any cross section of the accommodation part 201 parallel to the medium facing surface 40, the end closest to the top surface 1a of the substrate 1 is smaller in width in the track width direction than the end farthest from the top surface 1a of the substrate 1. Consequently, the comparative example cannot form the main pole 22 into such a desired shape that the rear end face 22b is perpendicular or almost perpendicular to the top surface 1a of the substrate 1 and the first end 22a1 of the front end face 22a is smaller in width in the track width direction than the second end 22a2 of the front end face 22a.

In contrast to this, as described above, the present embodiment allows forming the accommodation part 201 such that the wall face 20a is perpendicular or almost perpendicular to the top surface 1a of the substrate 1, and in any cross section of the accommodation part 201 parallel to the medium facing surface 40, the end closest to the top surface 1a of the substrate 1 is smaller in width in the track width direction than the end farthest from the top surface 1a of the substrate 1. This makes it possible to form the main pole 22 of desired shape easily.

The other effects provided by the present embodiment will now be described. In the present embodiment, the edge part 18e of the plasmon generator 18 faces the bottom surface 21d of the core 21 at a predetermined distance therefrom. Further, surface plasmons are excited on the edge part 18e through coupling with the evanescent light that occurs at the bottom surface 21d of the core 21 based on the laser light propagating through the core 21. The surface plasmons propagate along the edge part 18e to the near-field light generating part 18g, and the near-field light generating part 18g generates near-field light based on the surface plasmons. According to the present embodiment, it is possible to increase the efficiency of transformation of the light propagating through the core 21 into near-field light, as compared with the case where the plasmon generator 18 is directly irradiated with laser light to generate near-field light.

Modification Examples

Figure 15:
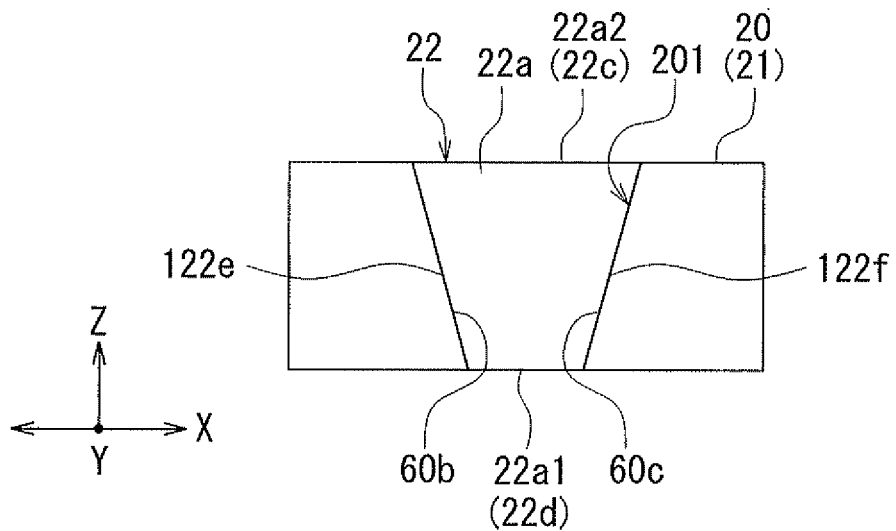
FIG. 15 is a front view showing a main pole and an accommodation layer of a thermally-assisted magnetic recording head of a first modification example of the first embodiment of the invention.
Figure 16:
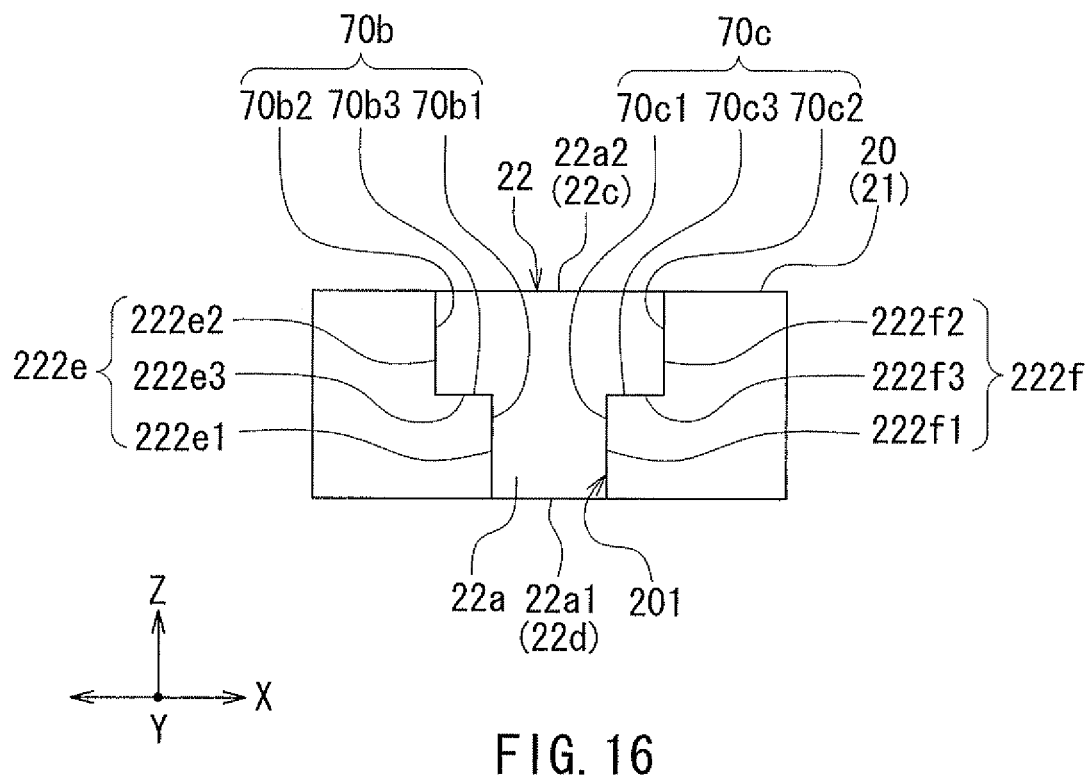
FIG. 16 is a front view showing a main pole and an accommodation layer of a thermally-assisted magnetic recording head of a second modification example of the first embodiment of the invention.

First and second modification examples of the present embodiment will now be described with reference to FIG. 15 and FIG. 16. FIG. 15 is a front view showing the main pole and the accommodation layer of the thermally-assisted magnetic recording head of the first modification example of the present embodiment. FIG. 16 is a front view showing the main pole and the accommodation layer of the thermally-assisted magnetic recording head of the second modification example of the present embodiment.

In the first modification example, the accommodation layer 20 has wall faces 60b and 60c, instead of the wall faces 20b and 20c. In any cross section of the accommodation part 201 parallel to the medium facing surface 40, the distance between the wall faces 60b and 60c in the track width direction (the X direction) increases with increasing distance from the top surface 1a of the substrate 1.

In the first modification example, the main pole 22 has first and second side surfaces 122e and 122f, instead of the first and second side surfaces 22e and 22f. The first and second side surfaces 122e and 122f are covered with the core 21. The first side surface 122e is in contact with the wall face 60b. The second side surface 122f is in contact with the wall face 60c. In any cross section of the main pole 22 parallel to the medium facing surface 40, the distance between the side surfaces 122e and 122f in the track width direction (the X direction) increases with increasing distance from the top surface 1a of the substrate 1.

In the second modification example, the accommodation layer 20 has wall faces 70b and 70c, instead of the wall faces 20b and 20c. The wall face 70b includes a lower part 70b1, an upper part 70b2, and a connection part 70b3 which connects the lower part 70b1 and the upper part 70b2 to each other. The wall face 70c includes a lower part 70c1, an upper part 70c2, and a connection part 70c3 which connects the lower part 70c1 and the upper part 70c2 to each other. The lower parts 70b1 and 70c1 and the upper parts 70b2 and 70c2 are all perpendicular or almost perpendicular to the top surface 1a of the substrate 1. The connection parts 70b3 and 70c3 are both parallel or almost parallel to the top surface 1a of the substrate 1. The distance between the lower parts 70b1 and 70c1 is smaller than the distance between the upper parts 70b2 and 70c2.

In the second modification example, the main pole 22 has first and second side surfaces 222e and 222f, instead of the first and second side surfaces 22e and 22f. The first and second side surfaces 222e and 222f are covered with the core 21. The first side surface 222e is in contact with the wall face 70b. Like the wall face 70b, the first side surface 222e has a lower part 222e1, an upper part 222e2, and a connection part 222e3. The second side surface 222f is in contact with the wall face 70c. Like the wall face 70c, the second side surface 222f has a lower part 222f1, an upper part 222f2, and a connection part 222f3.

The shapes of the wall faces 20b and 20c shown in FIG. 4, the wall faces 60b and 60c of the first modification example, and the wall faces 70b and 70c of the second modification example can be controlled by changing etching conditions such as the etching rate in the first and second etching steps.

Second Embodiment

Figure 17:
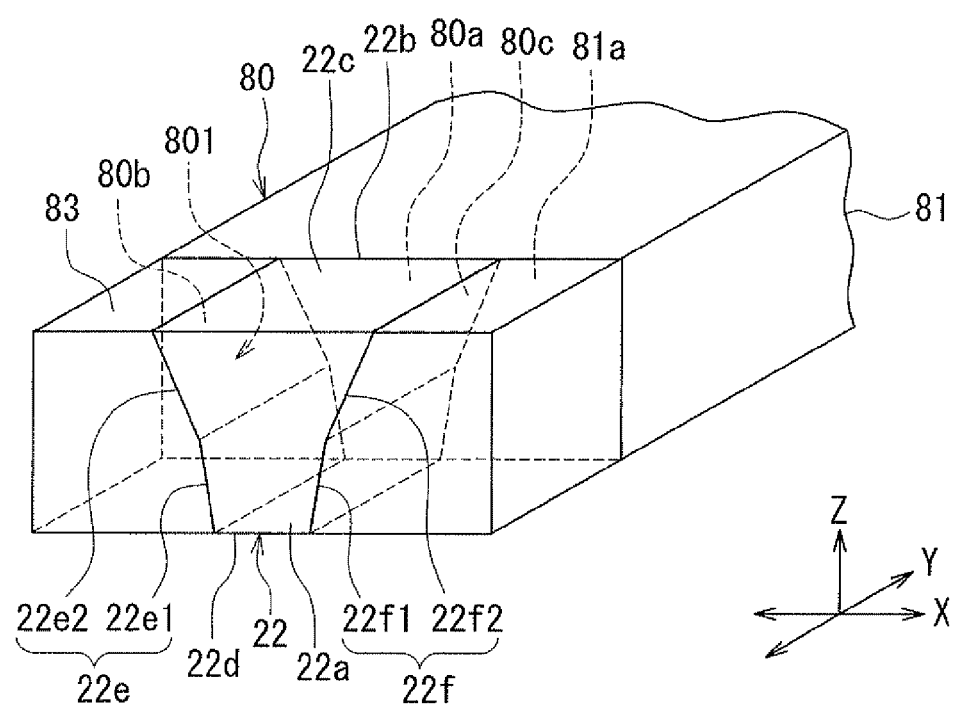
FIG. 17 is a perspective view showing the main part of a thermally-assisted magnetic recording head according to a second embodiment of the invention.

A second embodiment of the invention will now be described with reference to FIG. 17. FIG. 17 is a perspective view showing the main part of a thermally-assisted magnetic recording head according to the present embodiment. The thermally-assisted magnetic recording head according to the present embodiment has an accommodation layer 80, a core 81, and a clad layer 83 instead of the accommodation layer 20, the core 21, and the clad layer 23 of the first embodiment. The accommodation layer 80 also serves as the core 81 and the clad layer 83.

The accommodation layer 80 has an accommodation part 801 that accommodates the main pole 22. The accommodation layer 80 further has wall faces 80a, 80b, and 80c that face the accommodation part 801. The shape and layout of the wall faces 80a, 80b, and 80c are the same as those of the wall faces 20a, 20b, and 20c of the first embodiment.

The core 81 has an end face 81a that faces toward the medium facing surface 40 and that is located away from the medium facing surface 40. Unlike the core 21 of the first embodiment, the core 81 of the present embodiment does not have an end face located in the medium facing surface 40. The wall face 80a of the accommodation layer 80 is composed of part of the end face 81a of the core 81.

The main pole 22 and part of the clad layer 83 are interposed between the end face 81a of the core 81 and the medium facing surface 40. The first and second side surfaces 22e and 22f of the main pole 22 are covered with the clad layer 83. The clad layer 83 has two wall faces that constitute the wall faces 80b and 80c of the accommodation layer 80.

The step of forming the accommodation layer 80 and the main pole 22 in the method of manufacturing the thermally-assisted magnetic recording head according to the present embodiment and the method of forming the main pole 22 according to the present embodiment are different from the step of forming the accommodation layer 20 and the main pole 22 in the method of manufacturing the thermally-assisted magnetic recording head according to the first embodiment and the method of forming the main pole 22 according to the first embodiment in the following respects. In the present embodiment, an initial accommodation layer that is to later become the accommodation layer 80 is formed instead of the initial accommodation layer 20P of the first embodiment. The initial accommodation layer is composed of the core 81 and a dielectric layer that is to later become the clad layer 83. In the first etching step of the present embodiment, the dielectric layer of the initial accommodation layer is etched to form a groove in the initial accommodation layer (the dielectric layer). In the second etching step of the present embodiment, a part of the dielectric layer including the groove is etched by RIE so that the initial accommodation layer becomes the accommodation layer 80 and the groove becomes the accommodation part 801.

The remainder of configuration, function and effects of the present embodiment are similar to those of the first embodiment.

The present invention is not limited to the foregoing embodiments, and various modifications may be made thereto. For example, in the present invention, the wall faces 20b and 20c of the accommodation layer 20 (the wall faces 80b and 80c of the accommodation layer 80) may be curved.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of forming a main pole of a thermally-assisted magnetic recording head, the thermally-assisted magnetic recording head comprising:
   a medium facing surface that faces a recording medium;
   the main pole that produces a write magnetic field for writing data on the recording medium;
   an accommodation layer including an accommodation part that accommodates the main pole;
   a waveguide having a core and a clad, the core allowing light to propagate therethrough;
   a plasmon generator having a near-field light generating part located in the medium facing surface, the plasmon generator being configured so that a plasmon is excited based on the light propagating through the core, and the near-field light generating part generates near-field light based on the plasmon; and
   a substrate having a top surface, wherein:
   the main pole, the accommodation layer, the waveguide, and the plasmon generator are disposed above the top surface of the substrate;
   the core has an end face that faces toward the medium facing surface and that is located away from the medium facing surface, the core being located farther from the top surface of the substrate than is the plasmon generator;
   the main pole has a front end face located in the medium facing surface and a rear end face opposite to the front end face, the main pole being interposed between the end face of the core and the medium facing surface;
   the accommodation layer has a wall face that faces the accommodation part and that defines the shape of the rear end face of the main pole; and
   the front end face of the main pole has a first end closer to the top surface of the substrate and a second end farther from the top surface of the substrate, the first end being smaller than the second end in width in a track width direction,
   the method of forming the main pole comprising:
   a step of forming an initial accommodation layer having a top surface;
   a step of forming a first etching mask on the top surface of the initial accommodation layer, the first etching mask having a first opening;
   a first etching step of etching the initial accommodation layer by reactive ion etching using the first etching mask to thereby form a groove in the initial accommodation layer;
   a step of forming a second etching mask on the top surface of the initial accommodating layer after the first etching step, the second etching mask having a second opening;
   a second etching step of etching a part of the initial accommodation layer including the groove by reactive ion etching using the second etching mask so that the initial accommodation layer becomes the accommodation layer and the groove becomes the accommodation part; and
   a step of forming the main pole in the accommodation part, wherein:
   the first etching mask has first and second sidewalls that face the first opening, the first and second sidewalls being opposed to each other and being at a first distance from each other in the track width direction;
   the second etching mask has third and fourth sidewalls that face the second opening, the third and fourth sidewalls being opposed to each other and being at a second distance from each other in the track width direction, the second distance being greater than the first distance; and
   in any cross section of the accommodation part parallel to the medium facing surface, an end closest to the top surface of the substrate is smaller in width in the track width direction than an end farthest from the top surface of the substrate.

2. The method of forming the main pole of the thermally-assisted magnetic recording head according to claim 1, further comprising a step of forming a third etching mask on the top surface of the initial accommodation layer before the step of forming the first etching mask, the third etching mask being intended for defining a position of the wall face of the accommodation layer, wherein:
   the first etching step etches the initial accommodation layer using the first etching mask and the third etching mask; and
   the second etching step etches the initial accommodation layer using the second etching mask and the third etching mask.

3. The method of forming the main pole of the thermally-assisted magnetic recording head according to claim 1, wherein the wall face of the accommodation layer forms an angle of 10° or less with respect to a direction perpendicular to the top surface of the substrate.

4. The method of forming the main pole of the thermally-assisted magnetic recording head according to claim 1, wherein the accommodation layer also serves as the core.

5. The method of forming the main pole of the thermally-assisted magnetic recording head according to claim 1, wherein the accommodation layer also serves as the clad.

6. A method of manufacturing a thermally-assisted magnetic recording head, the thermally-assisted magnetic recording head comprising:
   a medium facing surface that faces a recording medium;
   a main pole that produces a write magnetic field for writing data on the recording medium;
   an accommodation layer including an accommodation part that accommodates the main pole;
   a waveguide having a core and a clad, the core allowing light to propagate therethrough;
   a plasmon generator having a near-field light generating part located in the medium facing surface, the plasmon generator being configured so that a plasmon is excited based on the light propagating through the core, and the near-field light generating part generates near-field light based on the plasmon; and
   a substrate having a top surface, wherein:
   the main pole, the accommodation layer, the waveguide, and the plasmon generator are disposed above the top surface of the substrate;
   the core has an end face that faces toward the medium facing surface and that is located away from the medium facing surface, the core being located farther from the top surface of the substrate than is the plasmon generator;

the main pole has a front end face located in the medium facing surface and a rear end face opposite to the front end face, the main pole being interposed between the end face of the core and the medium facing surface;

the accommodation layer has a wall face that faces the accommodation part and that defines the shape of the rear end face of the main pole; and the front end face of the main pole has a first end closer to the top surface of the substrate and a second end farther from the top surface of the substrate, the first end being smaller than the second end in width in a track width direction, the method of manufacturing the thermally-assisted magnetic recording head comprising the steps of:

forming the plasmon generator;

forming the waveguide after the plasmon generator is formed; and forming the accommodation layer and the main pole after the plasmon generator is formed, wherein the step of forming the accommodation layer and the main pole includes:

a step of forming an initial accommodation layer having a top surface;

a step of forming a first etching mask on the top surface of the initial accommodation layer, the first etching mask having a first opening;

a first etching step of etching the initial accommodation layer by reactive ion etching using the first etching mask to thereby form a groove in the initial accommodation layer;

a step of forming a second etching mask on the top surface of the initial accommodating layer after the first etching step, the second etching mask having a second opening;

a second etching step of etching a part of the initial accommodation layer including the groove by reactive ion etching using the second etching mask so that the initial accommodation layer becomes the accommodation layer and the groove becomes the accommodation part; and a step of forming the main pole in the accommodation part, wherein:

the first etching mask has first and second sidewalls that face the first opening, the first and second sidewalls being opposed to each other and being at a first distance from each other in the track width direction;

the second etching mask has third and fourth sidewalls that face the second opening, the third and fourth sidewalls being opposed to each other and being at a second distance from each other in the track width direction, the second distance being greater than the first distance; and in any cross section of the accommodation part parallel to the medium facing surface, an end closest to the top surface of the substrate is smaller in width in the track width direction than an end farthest from the top surface of the substrate.

7. The method of manufacturing the thermally-assisted magnetic recording head according to claim 6, wherein:

the step of forming the accommodation layer and the main pole further includes a step of forming a third etching mask on the top surface of the initial accommodation layer before the step of forming the first etching mask, the third etching mask being intended for defining a position of the wall face of the accommodation layer;

the first etching step etches the initial accommodation layer using the first etching mask and the third etching mask; and the second etching step etches the initial accommodation layer using the second etching mask and the third etching mask.

8. The method of manufacturing the thermally-assisted magnetic recording head according to claim 6, wherein the wall face of the accommodation layer forms an angle of 10° or less with respect to a direction perpendicular to the top surface of the substrate.

9. The method of manufacturing the thermally-assisted magnetic recording head according to claim 6, wherein the accommodation layer also serves as the core.

10. The method of manufacturing the thermally-assisted magnetic recording head according to claim 6, wherein the accommodation layer also serves as the clad.

\* \* \* \* \*